US008861585B2

(12) United States Patent
Subramanian et al.

(10) Patent No.: US 8,861,585 B2
(45) Date of Patent: Oct. 14, 2014

(54) METHOD AND APPARATUS FOR ERROR RESILIENCE ALGORITHMS IN WIRELESS VIDEO COMMUNICATION

(75) Inventors: Sitaraman Ganapathy Subramanian, San Diego, CA (US); Gordon Kent Walker, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2028 days.

(21) Appl. No.: 11/624,614

(22) Filed: Jan. 18, 2007

(65) Prior Publication Data

US 2007/0177667 A1 Aug. 2, 2007

Related U.S. Application Data

(60) Provisional application No. 60/760,678, filed on Jan. 20, 2006, provisional application No. 60/760,755, filed on Jan. 20, 2006.

(51) Int. Cl.
*H04N 7/50* (2006.01)
*H04N 19/137* (2014.01)
(Continued)

(52) U.S. Cl.
CPC ... *H04N 19/00939* (2013.01); *H04N 19/00145* (2013.01); *H04N 19/00278* (2013.01); *H04N*
(Continued)

(58) Field of Classification Search
CPC .................... H04N 21/6131; H04N 19/00181; H04N 19/002
USPC ....................................................... 375/240
See application file for complete search history.

(56) References Cited

U.S. PATENT DOCUMENTS 5,613,015 A * 3/1997 Suzuki et al. ................. 382/173
5,729,647 A * 3/1998 Kim .............................. 386/208
(Continued)

FOREIGN PATENT DOCUMENTS

CL 152-07 1/2007
CL 153-07 1/2007
(Continued)

OTHER PUBLICATIONS

Neogi et al., Compression Techniques for Active Video Content, Apr. 2002, Data Compression Conference DCC 2002, pp. 1-11.*

(Continued)

*Primary Examiner* — David Pearson
*Assistant Examiner* — Kenneth Chang
(74) *Attorney, Agent, or Firm* — Ross L. Franks; Elaine H. Lo

(57) ABSTRACT

Methods and apparatuses to encode multimedia data enabling, among others, for example, improved decoded video quality, improved error recovery capabilities and/or improved decoding efficiency are described. A method according to the application includes one or more of the following: initializing a pixel-level reference counter for a current frame, performing a prediction of a next frame referring to the current frame, incrementing the pixel-level reference counter for each pixel of the current frame that is referenced during the prediction of the next frame, readjusting a macroblock bandwidth map of the current frame, repeating the steps of initializing, performing and readjusting for each next frame in a plurality of next frames referring to the current frame, and encoding the current frame based at least in part on the readjusted macroblock bandwidth map of the current frame.

45 Claims, 11 Drawing Sheets

(51) Int. Cl.

| | | |
|---|---|---|
| *H04N 19/176* | (2014.01) | |
| *H04N 19/61* | (2014.01) | |
| *H04N 21/61* | (2011.01) | |
| *H04N 19/107* | (2014.01) | |
| *H04N 19/166* | (2014.01) | |
| *H04N 19/154* | (2014.01) | |
| *H04N 19/134* | (2014.01) | |
| *H04N 19/89* | (2014.01) | |
| *H04N 19/182* | (2014.01) | |
| *H04N 19/149* | (2014.01) | |
| *H04N 19/103* | (2014.01) | |

(52) U.S. Cl.
CPC ............ 19/00781 (2013.01); *H04N 21/6131* (2013.01); *H04N 19/0003* (2013.01); *H04N 19/00242* (2013.01); *H04N 19/002* (2013.01); *H04N 19/00133* (2013.01); *H04N 19/00303* (2013.01); *H04N 19/00181* (2013.01); *H04N 19/00018* (2013.01)
USPC ............... 375/240; 348/348.1; 348/387.1; 348/394.1; 348/420.1

(56) References Cited

U.S. PATENT DOCUMENTS

| | | | | |
|---|---|---|---|---|
| 5,793,895 | A | 8/1998 | Chang et al. | |
| 6,025,888 | A | 2/2000 | Pauls | |
| 6,037,985 | A * | 3/2000 | Wong | 375/240.03 |
| 6,160,846 | A * | 12/2000 | Chiang et al. | 375/240.05 |
| 6,430,222 | B1 * | 8/2002 | Okada | 375/240.03 |
| 6,466,624 | B1 * | 10/2002 | Fogg | 375/240.27 |
| 6,574,277 | B1 | 6/2003 | Miyamoto | |
| 6,795,076 | B2 * | 9/2004 | Deering et al. | 345/502 |
| 2001/0043653 | A1 * | 11/2001 | Hosaka | 375/240.16 |
| 2002/0064228 | A1 * | 5/2002 | Sethuraman et al. | 375/240.12 |
| 2002/0094028 | A1 | 7/2002 | Kimoto | |
| 2003/0031128 | A1 | 2/2003 | Kim et al. | |
| 2003/0235249 | A1 | 12/2003 | Zhao et al. | |
| 2004/0189866 | A1 * | 9/2004 | Lin et al. | 348/452 |
| 2005/0084007 | A1 * | 4/2005 | Lightstone et al. | 375/240.03 |
| 2005/0276329 | A1 * | 12/2005 | Adiletta et al. | 375/240.16 |
| 2006/0088099 | A1 * | 4/2006 | Gao et al. | 375/240.16 |
| 2006/0104366 | A1 | 5/2006 | Huang et al. | |
| 2006/0152585 | A1 * | 7/2006 | Bourret et al. | 348/180 |
| 2006/0159169 | A1 * | 7/2006 | Hui et al. | 375/240.03 |
| 2007/0030894 | A1 | 2/2007 | Tian et al. | |
| 2007/0073779 | A1 | 3/2007 | Walker | |
| 2007/0088971 | A1 | 4/2007 | Walker | |

FOREIGN PATENT DOCUMENTS

| | | | |
|---|---|---|---|
| EP | 0855839 | A1 | 7/1998 |
| JP | 11331839 | A | 11/1999 |
| JP | 2002016913 | A | 1/2002 |
| JP | 2002537736 | A | 11/2002 |
| JP | 2003032689 | A | 1/2003 |
| RU | 2217882 | | 11/2003 |
| WO | WO2005062625 | A1 | 7/2005 |
| WO | 2007084994 | | 7/2007 |
| WO | 2007085000 | | 7/2007 |

OTHER PUBLICATIONS

International Search Report—PCT/US07/060794—International Search Authority—European Patent Office—Jul. 19, 2007.
Written Opinion—PCT/US07/060794—International Search Authority—European Patent Office—Jul. 19, 2007.
International Report on Patentability—PCT/US07/060794—The International Bureau of WIPO, Geneva, Switzerland. Jul. 22, 2008.
TIA-Standard, "Forward Link Only Air Interface Specification for Terrestrial Mobile Multimedia Multicast", TIA-1099, Aug. 2006.
Zhao, C. et al., "Using inter-frame dependence history to select intra-refresh blocks," Electronics Letters, IEE Stevenage, GB, 38(22): 1337-1338, Oct. 24, 2002.
Chiou H.-J. et al., "Error-resilient transcoding using adaptive intra refresh for video streaming," ISCAS 2004 Proc. of the International Symposium on Circuits and Systems, May 23-26, 2004, pp. 777-780.
Cote, G. et al., "Optimal mode selection and synchronization for robust video communications over error-prone networks," IEEE Journal on selected areas in communications, 18(6): 952-965, Jun. 2000.
Zhang, R., "Video coding with optimal inter/intra-mode switching for packet loss resilience," IEEE Journal on selected areas in communications, 18(6): 966-976, Jun. 2000.
Cote, G. & Kossentini, F., "Optimal intra coding of blocks for robust video communication over the internet," Signal Processing: Image Communication, 15(1-2): 25-34, Sep. 1999.
Iain Richardson "H.264 and MPEG-4 Video Compression: Video Coding for Next-Generation Multimedia", pp. 67-68, 270-285, Copyright 2003.
Taiwan Search Report—TW096102105—TIPO—Sep. 17, 2011.
Zhang et al. "Error resilience Video Coding in H.264 Encoder with potential distortion tracking", 2004 International Conference on Image processing (ICIP).

* cited by examiner

METHOD AND APPARATUS FOR ERROR RESILIENCE ALGORITHMS IN WIRELESS VIDEO COMMUNICATION

CROSS-REFERENCE TO RELATED APPLICATIONS

Claim of Priority Under 35 U.S.C. §119

This Application for Patent claims priority to Provisional Application Ser. No. 60/760,678 entitled "Method and Apparatus for Adaptive Intra Refresh Based on Prediction Hierarchy for Wireless Video Communications" filed Jan. 20, 2006, which is assigned to the assignee of this application and which is fully incorporated herein by reference for all purposes.

This Application for Patent claims priority to Provisional Application Ser. No. 60/760,755 entitled "A Method of Error Resilience for Wireless Video Communication" filed Jan. 20, 2006, which is assigned to the assignee of this application and which is fully incorporated herein by reference for all purposes.

BACKGROUND

1. Field of the Application

This application is directed to multimedia signal processing and, more particularly, to wireless video communication.

2. Description of the Related Art

Multimedia processing systems, such as video encoders, may encode multimedia data using encoding methods based on international standards such as Moving Picture Experts Group (MPEG)-1, -2 and -4 standards, the International Telecommunication Union (ITU)-T H.263 standard, and the ITU-T H.264 standard and its counterpart, ISO/IEC MPEG-4, Part 10, i.e., Advanced Video Coding (AVC). Such encoding methods generally are directed to compressing the multimedia data for transmission and/or storage. Compression is broadly the process of removing redundancy from the data.

A video signal may be described in terms of a sequence of pictures, which include frames (an entire picture), or fields (e.g., an interlaced video stream comprises fields of alternating odd or even lines of a picture). As used herein, the term "frame" refers to a picture, a frame or a field. Video encoding methods compress video signals by using lossless or lossy compression algorithms to compress each frame. Intra-frame coding (herein referred to as intra-coding) refers to encoding a frame using only that frame. Inter-frame coding (herein referred to as inter-coding) refers to encoding a frame based on other, "reference," frames. For example, video signals often exhibit temporal redundancy in which frames near each other in the temporal sequence of frames have at least portions that match or at least partially match each other.

Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. As used herein, the term "block" refers to either a macroblock or a subblock.

Encoders take advantage of this temporal redundancy using inter-coding motion compensation based algorithms. Motion compensation algorithms identify portions of a reference frame that at least partially match a block. The block may be shifted in the frame relative to the matching portion of the reference frame. This shift is characterized by a motion vector. Any differences between the block and partially matching portion of the reference frame may be characterized in terms of a residual. The encoder may encode a frame as data that comprises one or more of the motion vectors and residuals for a particular partitioning of the frame. A particular partition of blocks for encoding a frame may be selected by approximately minimizing a cost function that, for example, balances encoding size with distortion of the content resulting from an encoding.

Inter-coding enables more compression efficiency than intra-coding. However, inter-coding can create problems when reference data (e.g., reference frames or reference fields) are lost due to channel errors, etc. In these cases, decoding of inter-coded data may not be possible or may result in undesired errors and error propagation. Decoders may employ concealment schemes which attempt to conceal or cover-up erroneous data with data derived from neighboring blocks or from data in other frames. Improvement of concealment algorithms may provide some improvement in the quality of concealed portions of erroneous video data. However, there is a limit on how high a quality the concealed image will exhibit due to the heavy dependence of concealment algorithms on spatio-temporal information. The concealed data may not be of high quality and the viewing experience may be degraded. In addition, decoding of the signal may become impossible and resynchronization may be required. Error propagation may be limited, and resynchronization (or initial acquisition) may be enabled, by encoding methods that refresh the video. A refreshed video signal can be decoded without reference to or knowledge of other frames.

An independently decodable intra-coded frame is the most common form of frame that enables refreshing of the video signal. The MPEG-x and H.26x standards use what is known as a group of pictures (GOP) which comprises an intra-coded frame (also called an I-frame) and temporally predicted P-frames or bi-directionally predicted B frames that reference the I-frame and/or other P and/or B frames within the GOP. Longer GOP's are desirable for the increased compression, but shorter GOP's allow for quicker acquisition and resynchronization. Increasing the number of I-frames will refresh the video signal more frequently, thereby further limiting error propagation and providing quicker acquisition and resynchronization, but at the expense of lower compression. What is needed is a way to encode video data that limits error propagation of the video stream at the decoder while preserving compression efficiency.

SUMMARY

The system, method, and devices of the application each have several aspects, no single one of which is solely responsible for its desirable attributes. Without limiting the scope of this application as expressed by the claims which follow, its more prominent features will now be discussed briefly. After considering this discussion, and particularly after reading the section entitled "Detailed Description of Certain Embodiments" one will understand how the sample features of this application can provide some improvements that include, among others, for example, improved decoded video quality, improved error recovery, improved error resilience and/or improved wireless communication efficiency.

A method of processing multimedia data that includes multiple video frames, where the method includes initializing a pixel-level reference counter for a current frame, performing a prediction of a next frame referring to the current frame and readjusting a macroblock bandwidth map of the current frame.

A processor, for processing multimedia data including multiple video frames is described, where the processor is being configured to initialize a pixel-level reference counter for a current frame, perform a prediction of a next frame referring to the current frame, and readjust a macroblock bandwidth map of the current frame.

An apparatus for processing multimedia data that includes multiple video frames is presented, where the apparatus includes an initializer for initializing a pixel-level reference counter for a current frame, a performer for performing a prediction of a next frame referring to the current frame, and a readjuster for readjusting a macroblock bandwidth map of the current frame.

An apparatus for processing multimedia data that includes multiple video frames is presented, where the apparatus includes, means for initializing a pixel-level reference counter for a current frame, means for performing a prediction of a next frame referring to the current frame, and means for readjusting a macroblock bandwidth map of the current frame.

A machine readable medium, for processing multimedia data that includes a plurality of video frames is describe, where the machine readable medium includes instructions that upon execution cause a machine to initialize a pixel-level reference counter for a current frame, perform a prediction of a next frame referring to the current frame, and readjust a macroblock bandwidth map of the current frame.

DETAILED DESCRIPTION OF CERTAIN EMBODIMENTS

The following detailed description is directed to certain sample embodiments of the application. However, the application can be embodied in a multitude of different ways as defined and covered by the claims. In this description, reference is made to the drawings wherein like parts are designated with like numerals throughout.

Video signals may be characterized in terms of a series of pictures, frames, fields or slices. As used herein, the term "frame" is a broad term that may encompass either frames of a progressive video signal, fields of an interlaced video signal, or slices of either.

Embodiments include systems and methods of improving processing in an encoder in a multimedia transmission system. Multimedia data may include one or more of motion video, audio, still images, or any other suitable type of audio-visual data. Embodiments include an apparatus and method of data (e.g., video) communication.

Figure 1:
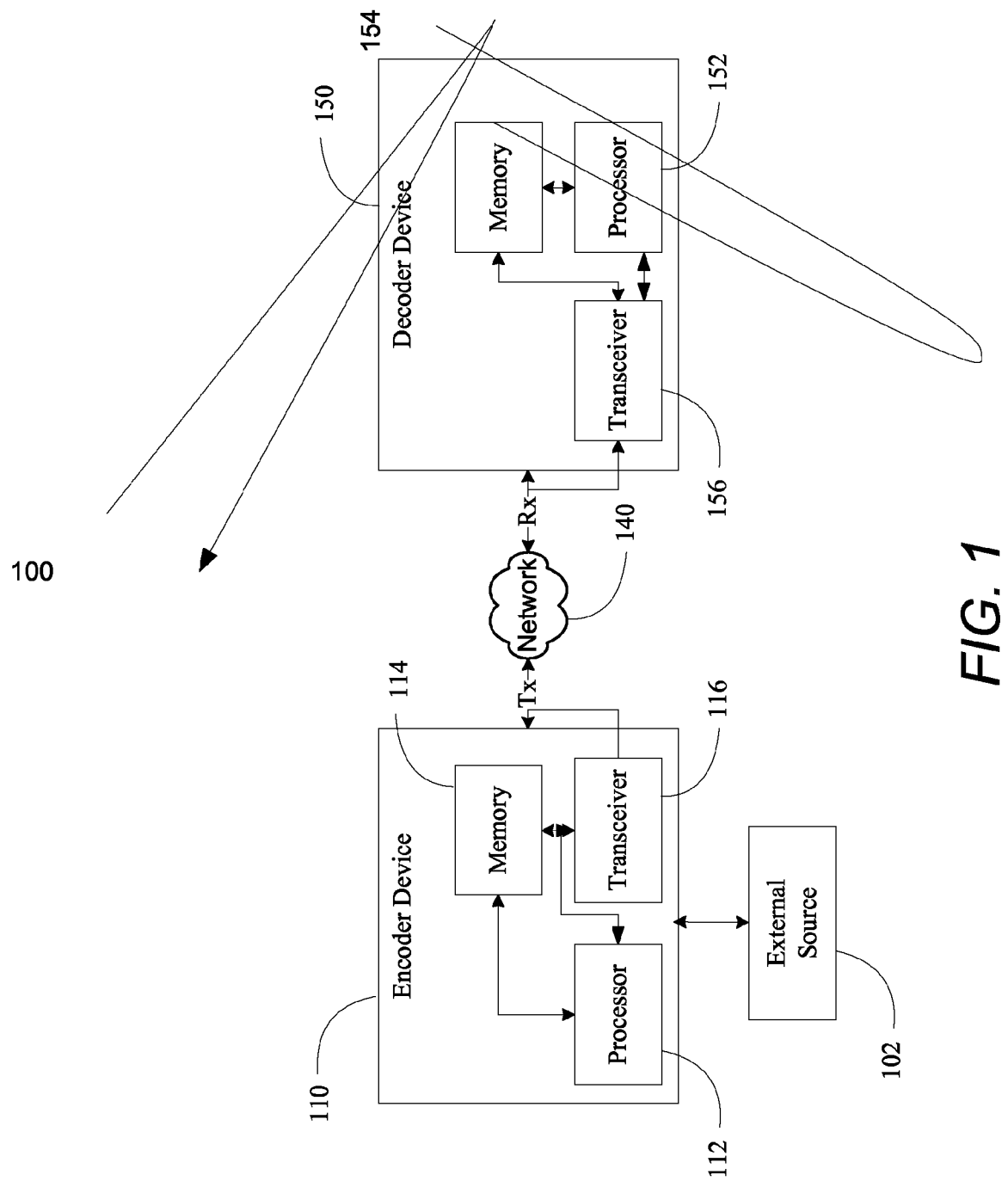
FIG. 1 is a block diagram illustrating a multimedia communications system according to one aspect.

FIG. 1 is a block diagram illustrating a multimedia communications system 100 according to one aspect. The system 100 includes an encoder device 110 in communication with a decoder device 150 via a network 140, which can be, for example, an error prone network such as a wireless network. In one example, the encoder device receives a multimedia signal from an external source 102 and encodes that signal for transmission on the network 140.

In this example, the encoder device 110 comprises a processor 112 coupled to a memory 114 and a transceiver 1 16. The processor 112 may include one or more of a general purpose processor and/or a digital signal processor. The memory 114 may include one or more of solid state and/or disk based storage. The processor 112 encodes data from the multimedia data source and provides it to the transceiver 116 for communication over the network 140.

In this example, the decoder device 150 comprises a processor 152 coupled to a memory 154 and a transceiver 156. The processor 152 may include one or more of a general purpose processor and/or a digital signal processor. The memory 154 may include one or more of solid state and/or disk based storage. The transceiver 156 is configured to receive multimedia data over the network 140 and provide it to the processor 152 for decoding. In one example, the transceiver 156 includes a wireless transceiver. The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, or a DVB-H system.

Figure 2:
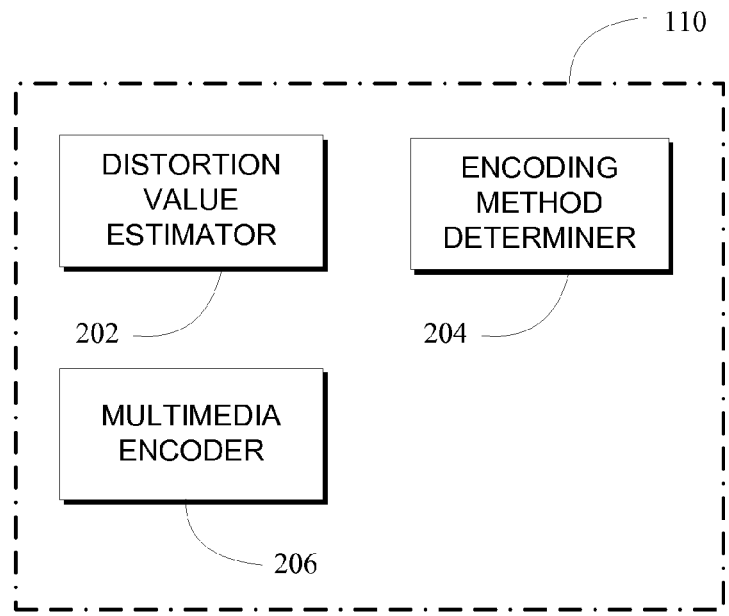
FIG. 2 is a block diagram illustrating an embodiment of an encoder device that may be used in a system such as illustrated in FIG. 1.

FIG. 2 is a block diagram illustrating an embodiment of the encoder device 110 that may be used in a system such as the system 100 illustrated in FIG. 1. In this embodiment, the encoder 110 comprises a distortion value estimator element 202, an encoding method determiner 204, and a multimedia encoder element 206. The distortion value estimator 202 estimates a distortion value for portions of multimedia data that are being encoded. The distortion value is based in part on error propagation from other portions of video that the current portion is predicted from and the likelihood that the other portions are received in error. The distortion value also includes a distortion component due to errors introduced at the decoder while concealing the portion of video data if it were received in error. The distortion value estimator may consider multiple encoding methods and calculate distortion values for each of the encoding methods.

The encoding method determiner 204 determines an encoding method that will be used to encode the portion of video data based on the estimated distortion value. The encoding method determiner 204 and the distortion value estimator 202 may work together to calculate multiple distortion values for multiple encoding methods (for example multiple inter-coding methods) and pick the encoding method that results in the least distortion. The encoding method determiner may compare the distortion value to a threshold and, based on the comparison, determine that another encoding method is needed. The other encoding method may be an encoding method related to refreshing the video stream, such as intra-coding. The other encoding method may also be another form of inter-coding that results in a lower distortion value as estimated by the distortion value estimator 202. The encoding method determiner may also consider computational complexity along with distortion value in determining an encoding method that provides acceptable distortion and does not exceed a computational complexity level.

The multimedia encoder 206 performs the encoding method that was determined based on the distortion value. The encoding methods performed by the multimedia encoder 206 include inter-coding where portions of video are predicted temporally (e.g., using motion compensated prediction) in reference to other portions of video data located in other temporal frames. Other encoding methods include intra-coding, where portions of video are encoded such that they can be decoded independently without reference to other temporally located video data. In some embodiments, the intra-coding may use spatial prediction to take advantage of redundancy in the other video data located in the same temporal frame.

In some embodiments, one or more of the elements of the encoder 110 of FIG. 2 may be rearranged and/or combined. The elements may be implemented by hardware, software, firmware, middleware, microcode or any combination thereof. Details of the actions performed by the elements of the encoder 110 will be discussed in reference to the methods illustrated in FIG. 4 below.

Figure 3:
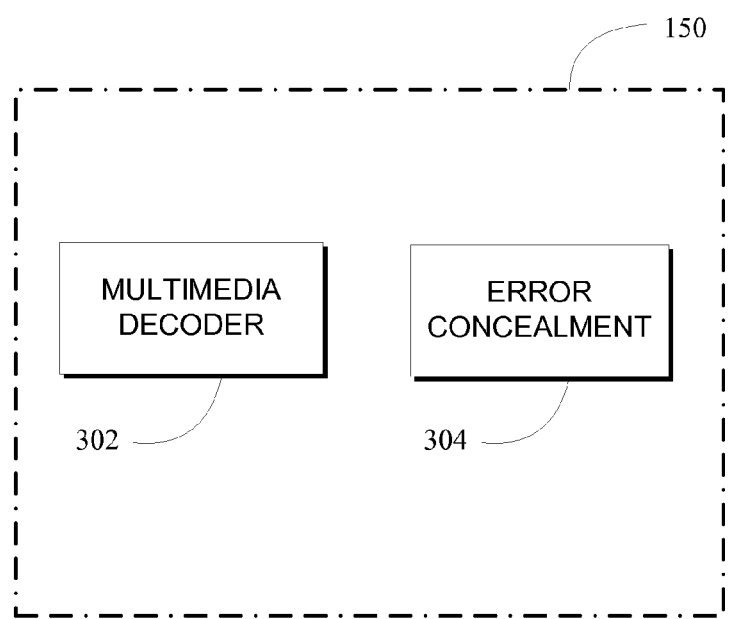
FIG. 3 is a block diagram illustrating an embodiment of a decoder device that may be used in a system such as illustrated in FIG. 1.

FIG. 3 is a block diagram illustrating an embodiment of the decoder device 150 that may be used in a system such as the system 100 illustrated in FIG. 1. In this embodiment, the decoder device 150 includes a multimedia decoder element 302 and an error concealment element 304. The multimedia decoder 302 decodes an encoded multimedia bitstream such as was encoded using the encoder device 110 of FIG. 2. The multimedia decoder performs inverse operation corresponding to the encoding operations used to encode the data. The encoded data may be inter-coded (e.g., temporally predicted data) and/or intra-coded data.

The error concealment element 304 performs various forms of error concealment that are used to conceal or cover-up portions of video that are received in error or are otherwise not decodable (e.g., due to synchronization loss). The concealment methods may include spatial error concealment, temporal error concealment and other methods. The concealment methods used may be the same or similar to the error concealment methods modeled when estimating the distortion values in the distortion value estimator 202 of the encoder device 110 of FIG. 2. While the present aspect does not require the same or similar concealment methods, use of such same or similar concealment methods in the decoder device 150 as were modeled in the encoder device may result in improved decoded video quality. In addition to performing error concealment, the error concealment element 304 may perform error recovery functions. Error recovery may be performed on sections of data that are determined to be erroneous in an attempt to parse out useable (e.g., error free) portions. These parsed out portions may also be used in error concealment by the error concealment element 304.

In some embodiments, one or more of the elements of the decoder 150 of FIG. 3 may be rearranged and/or combined. The elements may be implemented by hardware, software, firmware, middleware, microcode or any combination thereof. Details of the actions performed by the elements of the decoder 150 are beyond the scope of this discussion.

Figure 4A:
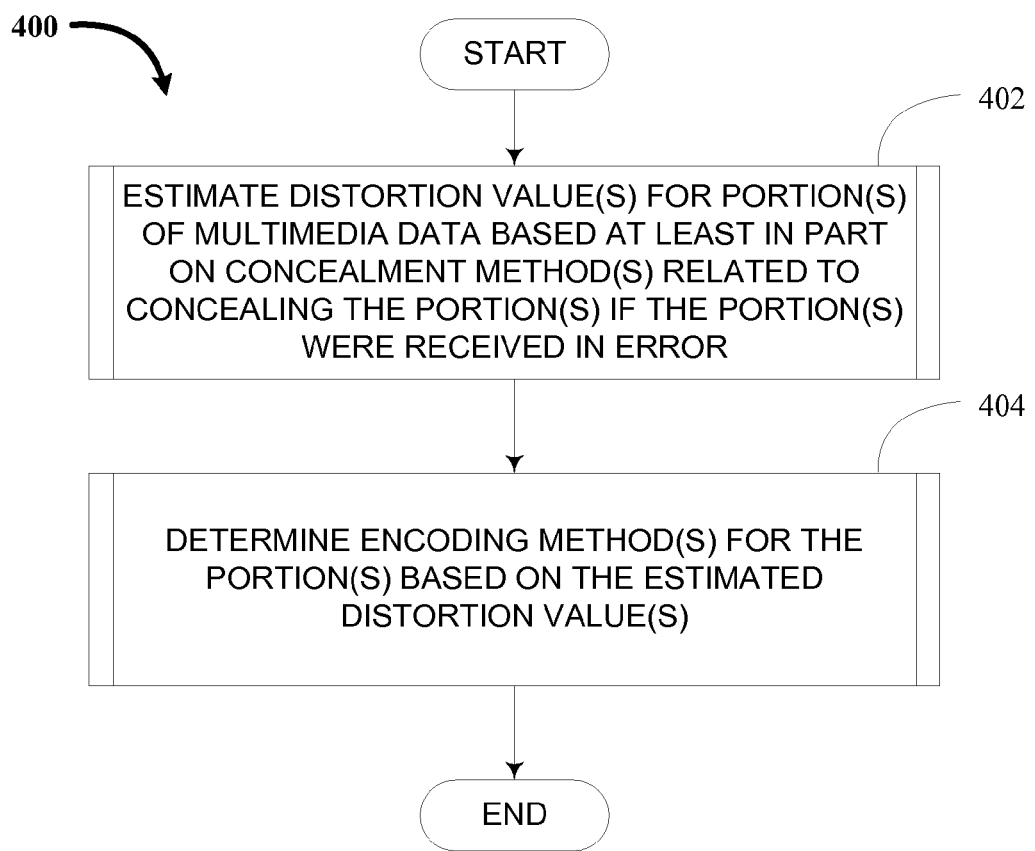
FIG. 4A is a flowchart illustrating an example of a method of encoding a portion of a video stream in a system such as illustrated in FIG. 1.

FIG. 4A is a flowchart illustrating an example of a method of encoding a portion of a video stream in a system such as illustrated in FIG. 1. In this example, the method estimates a distortion value for a portion of video being encoded. The distortion value is based on a probability of the encoded portion being received in error at a decoder and the error caused by a concealment method that is used to conceal the erroneous portion. By basing the distortion value on a decoder concealment method, the encoded video bitstream may be more robust to the effects of error propagation at the decoder, which may improve the decoded video quality. The method in this example can also determine an encoding method based on the estimated distortion value. The encoding method may be determined to minimize the distortion value among a plurality of encoding methods. The encoding method may be determined based on improving recoverability of the portion of video at the decoder. The encoding method may be determined to refresh the video portion so as to limit error propagation at the decoder.

Referring to FIG. 4A, method 400 begins at block 402 where an encoding device estimates a distortion value for a portion of multimedia data. The portion of multimedia data may be a pixel (e.g., luma and chroma, or red, green and blue, etc.), a block of pixels or any shape and size region of one or more pixels. The distortion value is based at least in part on a distortion component related to an error concealment method that may be used to conceal the video portion if it is received in error. The distortion value may include components from multiple concealment methods. For example, one component may represent distortion introduced by a first concealment method used if only the portion being encoded is received in error. In other words, all other video data that a decoder device could use to predict a concealed portion (referred to as prediction data) is assumed to be received error free. Other components of the distortion value may include distortion introduced by a second or third concealment method, where these concealment methods may be used by a decoder if one or more prediction portions are received in error. The concealment methods may include spatial concealment, temporal concealment and other forms of concealment. Details of a method of estimating a distortion value including temporal concealment will be discussed below. The distortion value estimator 202 of the encoder device 110 in FIG. 2 may perform the actions at the block 402.

Figure 5:
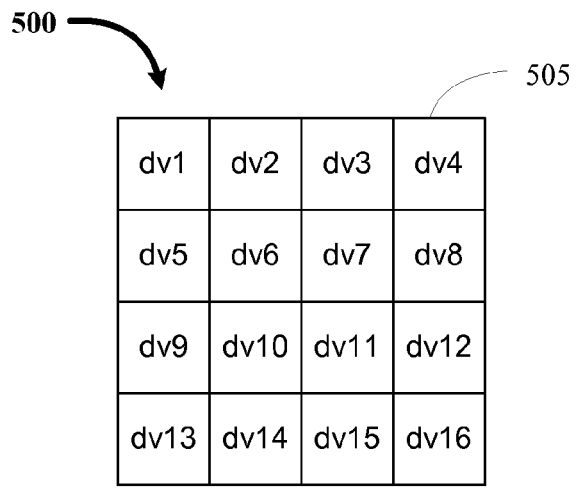
FIG. 5 graphically illustrates a distortion map that may be generated by the methods of FIGS. 4A and 4B.

In some examples, a distortion value is calculated at block 402 for each block in a frame of data. The blocks may be macroblocks (e.g., 16×16 pixel macroblocks), or sub-macroblocks of any size. The distortion values for each block in a frame may be stored in a distortion map. FIG. 5 graphically illustrates a distortion map that may be generated at block 402. The distortion map 500 contains multiple distortion value variables 505 (labeled dv1-dv16), one for each block in a frame. The distortion map 500 of a previous frame may be used in calculating the distortion values in a new frame. In this way, cumulative distortion may be easily calculated. If any block is determined to be refreshed, e.g., intra-coded, the distortion value of that block may be set to zero, or to the distortion value due to quantization or some other factor.

At block 404, the encoder device determines an encoding method to be used for the portion of multimedia data based on the estimated distortion value. In some examples, distortion values are calculated at block 402 for multiple encoding methods as part of a rate distortion calculation that is used for choosing which encoding method of multiple methods is to be used. For example, the encoding method that results in the minimum distortion value may be determined (at block 404) to be used for encoding the portion of multimedia data. In other examples, the distortion values are calculated based on a first encoding method (either inter-coded or intra-coded), and the distortion values are used to determine blocks that should be intra-coded, such as done in Adaptive Intra-Refresh (AIR). For example, the distortion value corresponding to a portion may be computed after a rate distortion based decision has resulted in finding the optimal motion vector(s) and mode to encode the portion. If the distortion value so obtained is greater than a threshold, then it may be determined to intra-code the portion using one of the intra-coding modes, e.g., 4×4 pixel intra-coding or 16×16 pixel intra-coding. In this way, the portion of multimedia is refreshed. Apart from intra-coding modes, certain inter-coding modes (P8×8, P16× 16, P16×8, P8×16, etc.) may also be determined based on the distortion value in some cases, although these may not result in a refreshed video. It should be noted that some of the blocks of the method 400 may be combined, omitted, rearranged or any combination thereof. Details of some embodiments of determining the encoding method at block 404 are discussed below in reference to FIG. 4B.

Details of an example algorithm for estimating the distortion value at block 402 will now be discussed. The distortion value in this example is related to a temporal concealment method that conceals an erroneous portion of multimedia using portions from two other frames, for example, a prior frame and a subsequent frame. However, other concealment methods may be represented using similar methods.

The example algorithm computes a recursive distortion value of the expected (i.e., statistical expectation) distortion value of unidirectionally predicted portions (such as in P Frames) of video. Other portions such as intra-coded portions and bidirectionally predicted portions may also be represented by similar algorithms. The algorithm is based in part on an assumed probability of the current MB being lost (defined as a probability "P") and a probability that predictors used by a concealment method are lost (defined as a probability "Q"). As at least one of the assumed probabilities P and Q are increased, the algorithm tends more towards yielding good error resilience/concealment while trading off compression efficiency. The converse happens when one decreases at least one of the probabilities P and Q.

The algorithm computes an expected distortion value for a portion of multimedia data. The portion of multimedia data may be any number of pixels and any shape. The example will be discussed in reference to the portion being a 16×16 pixel Macroblock (MB), but it should be noted that other portions may be represented as well. In one embodiment, the algorithm is used to estimate an expected distortion value for each MB of a frame to form a distortion map as discussed above in reference to FIG. 5. The expected distortion value in this example is computed in a recursive and motion-adaptive fashion. Although this expected distortion map is not exactly the MSE or $L_1$-norm distortion measure, it is expected to correlate reasonably well with these measures.

Figure 6:
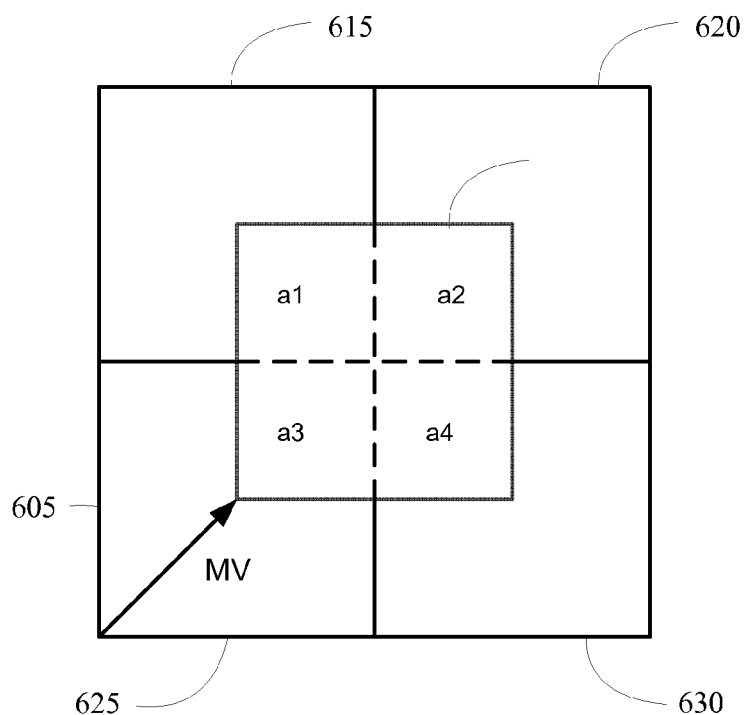
FIG. 6 graphically illustrates prediction regions used for estimating a portion of video such as used in motion compensated prediction methods.

The following notation is used for the discussion of the distortion value algorithm:

$D_t^{i,j}$=Cumulative distortion value of the (i,j)th macroblock in the 't' th frame P=Probability that the current MB is lost Q=Probability that a predictor used by the related concealment method is lost Given these assumptions, the current MB is received without any error at a probability equal to (1−P). In unidirectional prediction, the current MB is encoded in reference to a MB sized portion of another frame, the previous frame in this example. A motion vector MV gives the relative positions, or locations, of the current MB and the MB sized reference portion. The reference portion will generally not be aligned with the borders of a MB, but will overlap up to four regions of four MB's. FIG. 6 graphically illustrates the prediction regions used for estimating a portion of video using motion compensated prediction methods. A motion vector 605 points to a MB sized prediction region 610 made up of four area portions labeled a1, a2, a3 and a4. The area portions a1-a4, lie within four MB's 615, 620, 625 and 630, respectively. The distortion values of the MB's 615-630 may be obtained from a stored version of the distortion map of the previous frame. In this example, the cumulative distortion values of the four area portions a1-a4 in the prediction region 610 are weight averaged (e.g., based on the number of pixels in each area portion) to calculate the distortion value of the current MB. Thus, the estimated expected distortion value of the current macroblock due to the cumulative error propagation is given by:

$$(1-P)\left\{\frac{a_1 D_{t-1}^{i,j} + a_2 D_{t-1}^{i+1,j} + a_3 D_{t-1}^{i,j+1} + a_4 D_{t-1}^{i+1,j+1}}{256}\right\} \quad (1)$$

Where $a_1$, $a_2$, $a_3$, $a_4$ are the four area portions as illustrated in FIG. 6. Note that the distortion value given by formula (1) is normalized by dividing the weighted average of the 16×16 pixel region by 256.

In addition to the cumulative distortion from the prediction regions of the previous frame, the algorithm estimates distortion value components due to concealment of the current MB, if the current MB is received in error. As discussed above, it is assumed that the current MB is received in error with a probability of P. The distortion incurred by the current macroblock due to a concealment method may be approximated to be the sum of the concealment error (the error introduced by the concealment method and indicated by the term Conceal_Error) and the effects due to error propagation from the prediction regions used by the concealment method. As discussed above, it is assumed that the predictors (e.g., from the current and/or past frames) are available with a probability 1−Q. In this example, it is assumed that the concealment method(s) depends on availability of data in the current frame and a previous frame. The prediction region is assumed to be in the previous frame, as indicated by the cumulative distortion terms $D_{t-1}^{i,j}$. However, this is only an example and the prediction regions may be in the current frame or any other frame that is available. Thus, the distortion incurred due to a temporal error concealment method using prediction regions from the previous frame, where the portion being concealed is erroneous at a probability of P, and that depends on the availability of prediction data in the current frame and the previous frame (both available at a probability of 1−Q) may be computed as:

$$(P)(1-Q)(1-Q)\left\{\text{Conceal\_Error}+ \right. \\ \left. \frac{a'_1 D_{t-1}^{i1,j1} + a'_2 D_{t-1}^{i1-+1,j1} + a'_3 D_{t-1}^{i1,j1+1} + a'_4 D_{t-1}^{i1+1,j1+1}}{256}\right\} \quad (2)$$

Concealment error computations may be computationally complex. However, under some reasonable assumptions, they may be approximated as a difference in the following SAD (sum of accumulated differences in pixel values) values:

$SAD_{opt}$: SAD obtained between the original image and the compressed image when the optimal MV and the optimal encoding mode are used.

$SAD_{est}$: SAD obtained between the original image and the concealed image when the estimated MV is used (estimated by the temporal concealment algorithm)

This approximation may be written as follows:

$$(P)(1-Q)(1-Q)\left\{|SAD_{est}^1 - SAD_{opt}^1| + \right. \\ \left. \frac{(a'_1 D_{t-1}^{i1,j1} + a'_2 D_{t-1}^{i1+1,j1} + a'_3 D_{t-1}^{i1,j1+1} + a'_4 D_{t-1}^{i1+1,j1+1})}{256}\right\} \quad (3)$$

Where $a_1'$, $a_2'$, $a_3'$, $a_4'$ are four area portions in the previous frame (as illustrated in FIG. 6) that were used as the concealment portion prediction and are used to weight average the cumulative distortion. Note that the distortion value given by formula (3) is also normalized by dividing the weighted average of the 16×16 pixel region by 256.

Note that, when using formula (3), $SAD_{est}$ may be found to be less than $SAD_{opt}$ in some cases (due to motion compensation inaccuracies, for example), but the difference may be negligibly small and in those cases the Conceal_Error component may be approximated as zero.

Formula (3) represents a distortion value component that corresponds to the concealment method used when both the current frame and the previous frame are both available (where each occurs at a probability of 1−Q). However, different concealment errors may exist if some or all of the current frame and/or the past frame is received erroneously, where each occurs at a probability of Q. Distortion value components corresponding to four different concealment estimates may be considered, where the four concealment estimates correspond to four scenarios 1) current frame available and previous frame available, 2) current frame available but previous frame erroneous, 3) current frame erroneous but previous frame available and 4) both the current frame and the previous frame are erroneous. Details regarding the calculation of the four concealment estimates are not crucial to the understanding of the distortion value calculation, and will not be discussed herein. The cumulative distortion including the four distortion value components may be computed as:

$$D_t^{x,y} = (1-P)\left\{\frac{a_1 D_{t-1}^{i,j} + a_2 D_{t-1}^{i+1,j} + a_3 D_{t-1}^{i,j+1} + a_4 D_{t-1}^{i+1,j+1}}{256}\right\} + \quad (4)$$

-continued $$(P)(1-Q)(1-Q)\left\{|SAD_{est}^1 - SAD_{opt}^1| + \right. \\ \left. \frac{a'_1 D_{t-1}^{i1,j1} + a'_2 D_{t-1}^{i1+1,j1} + a'_3 D_{t-1}^{i1,j1+1} + a'_4 D_{t-1}^{i1+1,j1+1}}{256}\right\} +$$

$$(P)(Q)(1-Q)\left\{|SAD_{est}^2 - SAD_{opt}^2| + \right. \\ \left. \frac{a''_1 D_{t-1}^{i2,j2} + a''_2 D_{t-1}^{i2+1,j2} + a''_3 D_{t-1}^{i2,j2+1} + a''_4 D_{t-1}^{i2+1,j2+1}}{256}\right\} +$$

$$(P)(1-Q)(Q)\left\{|SAD_{est}^3 - SAD_{opt}^3| + \right. \\ \left. \frac{a'''_1 D_{t-1}^{i3,j3} + a'''_2 D_{t-1}^{i3+1,j3} + a'''_3 D_{t-1}^{i3,j3+1} + a'''_4 D_{t-1}^{i3+1,j3+1}}{256}\right\} +$$

$$(P)(Q)(Q)\left\{|SAD_{est}^4 - SAD_{opt}^4| + \right. \\ \left. \frac{a''''_1 D_{t-1}^{i4,j4} + a''''_2 D_{t-1}^{i4+1,j4} + a''''_3 D_{t-1}^{i4,j4+1} + a''''_4 D_{t-1}^{i4+1,j4+1}}{256}\right\}$$

Where the first concealment estimate results in a distortion of $|SAD_{est}^1 - SAD_{opt}^1|$, and the second concealment estimate results in a distortion of $|SAD_{est}^2 - SAD_{opt}^2|$, and so on. In addition, the cumulative distortions are weight averaged based on the areas (a', a'', a''' and a'''') of the prediction regions used in each of the four concealment estimates. The concealment estimates may be based on different types of concealment methods such as spatial concealment, bidirectional concealment, etc. For example, a concealment algorithm may conceal temporally sometimes and spatially other times, depending on deterministic/probabilistic criteria. The encoder device performing the distortion value calculation and determining which encoding method to use based on the distortion value may model the same or similar concealment methods that are used in a decoder in order to improve the error recovery and/or error concealment performance when the decoder receives erroneous data.

Note that other concealment estimates may be considered and included in Equation (4) based on the probabilities that other prediction regions are not available. Equation (4) may be used for each MB in a frame in order to form the distortion map as illustrated in FIG. 5. Thus, the distortion values calculated using Equation (4) comprise a weighted sum of distortions incurred by choosing multiple options of concealment, where the weight is the probability of each concealment option being chosen.

Figure 4B:
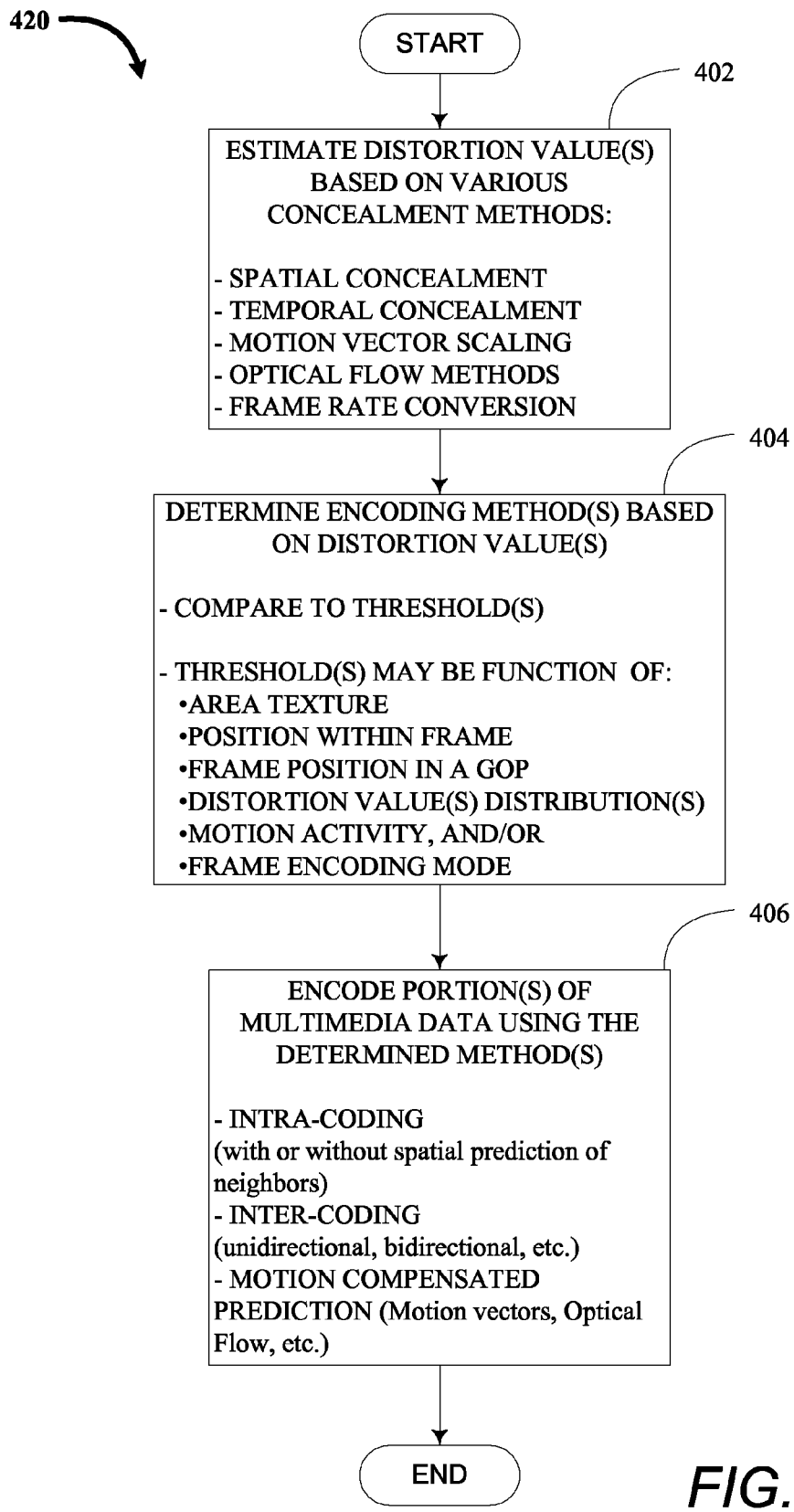
FIG. 4B is a flowchart illustrating in more detail an example of a method of encoding a portion of a video stream in a system such as illustrated in FIG. 1.

FIG. 4B is a flowchart illustrating in more detail an example of a method of encoding a portion of a video stream in a system such as illustrated in FIG. 1. Method 420 includes the blocks 402 and 404 as discussed above in reference to FIG. 4A including various concealment methods that may be considered when estimating the distortion value at the block 402 and various methods of determining the encoding method at the block 404.

At block 402, the distortion value may be estimated using algorithms similar to those discussed above in reference to Equation (4). The exact distortion value equations used depend on the type of concealment method that is being represented. The concealment methods being represented may include spatial concealment methods where prediction portions located in the same frame are used to conceal a portion received in error. In the case of spatial concealment within a frame, the cumulative distortion values of MB's in the current frame are used instead of distortion values from the previous frame. Temporal concealment methods may include unidirectional prediction as discussed above and represented by Equation (4), and may also include bi-directional prediction where availability of a subsequent frame may also be considered.

One example of a temporal concealment method is motion vector scaling. Motion vector scaling is a method that interpolates and/or extrapolates motion vectors from other frames to derive a motion vector for a portion of erroneous multimedia data in a current frame. Another example of a temporal concealment method is frame rate conversion. Frame rate conversion may be similar to motion vector scaling, but involves construction of an entire frame based on, typically, two surrounding frames. Other examples of temporal error concealment methods may be based on optical flow methods. Other forms of concealment that may be represented by the distortion value estimated at the block 402 include spatial and frequency domain interpolation, maximally smooth recovery, and projection into convex sets. Skilled technologists will recognize other forms of error concealment that may be represented when estimating the distortion value at the block 402 of the method 400.

As discussed above, the encoder device determines, at the block 404, an encoding method based on the distortion value that was estimated at the block 402. In some embodiments, the estimated distortion value is compared to a threshold and the encoding method is determined based on the comparison. The threshold may be a single value for all portions of multimedia data. However, the threshold may also vary according to methods such as those listed in the block 404 of the method 420. These methods will be discussed in relation to determining an encoding method based on exceeding a threshold, where the encoding method chosen if the threshold is exceeded will generally serve to refresh the portion (or at least decrease the estimated distortion value of the portion). However, it should be noted that encoding methods may also be determined based on the distortion value being less than a threshold.

In some examples, the threshold is varied as a function of a texture of an area in which the multimedia portion being encoded is located. Areas with a widely varying texture (e.g., large variations from pixel to pixel) may not show errors as much as areas with a less varied texture, and may therefore be afforded a higher threshold over which the encoding method may be determined to refresh the portion (e.g., using intra-coding). Areas with smooth or slightly varied texture, however, may show errors more and may therefore be assigned a lower threshold.

In some examples, the threshold may be varied as a function of the position, or location, of the portion being encoded within a frame. For example, portions on the edges may be assigned a higher threshold than portions in the middle. In this way, the areas where a viewer more frequently looks (e.g., the center of the frame) may be refreshed more often than areas on the edge where a view may not watch as often.

In some examples, the threshold may be a function of the position of the current frame being encoded within a GOP (group of pictures) or a superframe of multiple frames. A GOP generally starts with an intra-coded frame or a set of frames that include substantially all of the MB's within a frame being intra-coded at least once (known as adaptive intra refresh or AIR), and where the other frames in the GOP (or superframe) do not reference frames outside of the GOP. In order to assure that the MB's have a higher chance of being intra-coded at the start of a GOP, the threshold in the frames near the beginning of the GOP may have a lower threshold than the MB's near the end of the GOP.

In some examples, the threshold may be a function of the distribution of distortion values, in the distortion map for example, within a frame. For example, the threshold may be set adaptively to ensure a percentage of MB's within the frame are intra-coded based on the distribution of distortion values. This may be used to limit the number of intra-coded MB's to limit the data rate necessary for transmission. Even though the quality may be degraded for some frames (due to a high distribution of distortion values), the data rate may be kept to a desired level.

In some examples, the threshold may be a function of motion activity in an area of the frame containing the portion being encoded. Errors that occur in areas of video that are characterized by higher motion activity tend to be less perceivable than errors that occur in areas characterized by little motion. The threshold may be set to higher values in areas experiencing higher motion activity than in areas experiencing lower motion activity. Motion activity may be measured in many ways. For example, motion vector amplitude may be used as a motion activity indicator where higher amplitude motion vectors indicate higher motion activity. Variation of motion vector direction can also be used as a motion activity indicator. If most of the motion vectors in an area are pointing in substantially the same direction, this may be an indication of low motion activity. If motion vectors in neighboring blocks of an area are pointing in different directions, this may be an indication of high motion activity. Similar motion activity measures may be obtained using other motion compensation techniques such as optical flow.

In some examples, the threshold may be a function of the encoding mode of the portion of video being encoded. For example, some portions of video are typically not used as a reference for other predicted portions of video. B frames, for example, are not used for reference frames in many systems. Thus, the distortion value of the B frames in this type of system could be allowed to be higher since no other video will reference it. Since no other video will reference the B frame, the errors will persist for only one frame duration (e.g., $\frac{1}{30}^{th}$ of second in a 30 frame per second video sequence). Thus, the threshold could be higher for non-referenced portions of video than for portions of video that may be referenced by other predicted portions.

After the encoding method is determined, at the block 404, based on the distortion value estimated at the block 402, the process 420 continues at block 406, where the portion of multimedia data being encoded is encoded with the determined encoding method. The encoding methods at block 406 may include intra-coding with or without spatial prediction of neighbors. Intra-coding without spatial prediction of neighboring pixels may be chosen in order to reduce the distortion value calculated at the block 402. The encoding methods at block 406 may include unidirectional or bidirectional prediction using motion compensated prediction. Different forms of motion compensated prediction may be chosen over others in order to reduce the distortion value estimated at the block 402. Motion compensate prediction may include block matching, optical flow and other methods to calculate motion vectors as discussed above. It should be noted that some of the blocks of the method 420 may be combined, omitted, rearranged or any combination thereof.

Figure 7:
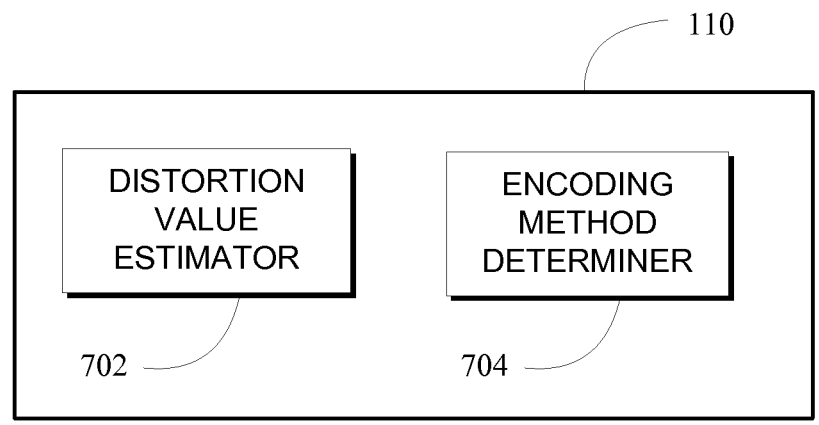
FIG. 7 is a functional block diagram illustrating an embodiment of an encoder device that may be used in a system such as illustrated in FIG. 1.

FIG. 7 is a functional block diagram illustrating an example of an encoder device 110 that may be used in a system such as illustrated in FIG. 1. This aspect includes means for estimating a distortion value for a first portion of multimedia data based at least in part on one or more concealment methods related to concealing the first portion if the first portion were received in error, and means for determining an encoding method for the first portion based at least in part on the estimated distortion value. Some examples of this aspect include where the estimating means comprises a distortion value estimator 702, and where the determining means comprises an encoding method determiner 704.

Figure 8:
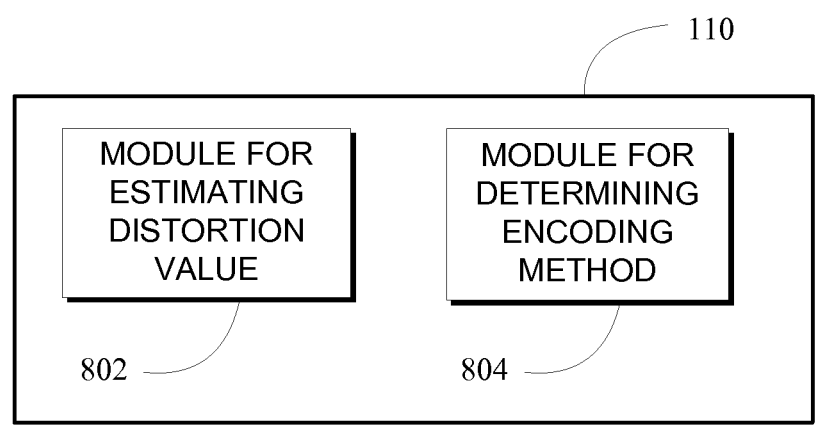
FIG. 8 is a functional block diagram illustrating an embodiment of an encoder device that may be used in a system such as illustrated in FIG. 1.

FIG. 8 is a functional block diagram illustrating an example of an encoder device 110 that may be used in a system such as illustrated in FIG. 1. This aspect includes means for estimating a distortion value for a first portion of multimedia data based at least in part on one or more concealment methods related to concealing the first portion if the first portion were received in error, and means for determining an encoding method for the first portion based at least in part on the estimated distortion value. In some examples of this aspect, the estimating means comprises a module for estimating distortion value 802 and the determining means comprises a module for determining encoding method 804.

The error resilience strategies and algorithms that apply to video transmissions over error prone environments are discussed. These concepts apply to any individual or combination of existing or future application, transport and physical layer or other technologies. The fundamental aspect is of effective error robustness algorithms by integrating an understanding of error susceptibility properties and error protection capabilities among the OSI layers in conjunction with desirable properties of the communication system such as low latency and high throughput. One of the primary advantages is recoverability from fading and multi-path channel errors. Although the example of a video communication system is described, the error resilience aspects described may be extended to data communication in error prone environments.

Figure 9:
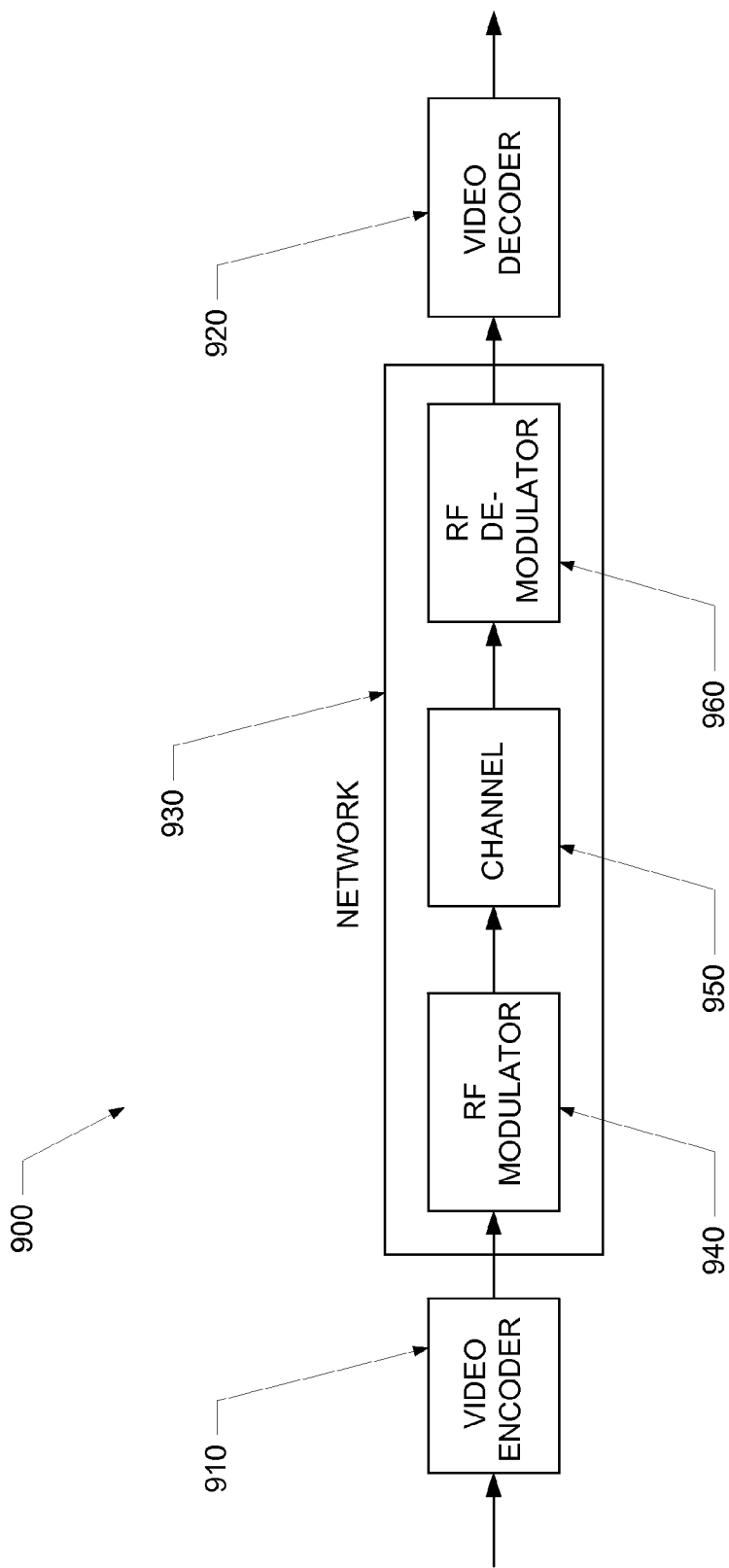
FIG. 9 illustrates a wireless communication system 900 according to certain embodiments.

FIG. 9 illustrates a wireless communication system 900 according to certain embodiments. Such an exemplary video communication system generally includes a video compression system (not shown) consisting of a video encoder 910 and a video decoder 920 connected by a communication network 930. Network 930 can further include an RF modulator 940, a network channel 950 and an RF de-modulator 960. Wireless networks are one class of error prone networks where the channel can exhibit log-normal fading or shadowing and multi-path fading in mobile scenarios in addition to general path loss. To combat channel errors and provide reliable communications for application layer data, RF modulator 940 can include Forward Error Correction (FEC), which can include interleaving and channel coding, such as convolutional or turbo coding.

Generally, video compression can reduce redundancy in the source video and increase the amount of information carried in each bit of the coded video data. This can increase the impact in quality when even a small portion of the coded video is lost. Spatial and temporal prediction inherent in video compression systems can aggravate the loss and can cause errors to propagate, resulting in visible artifacts in the reconstructed video. Error resilience algorithms at the video encoder and error recovery algorithms at the video decoder can enhance the error robustness of the video compression system.

Generally, the video compression system is agnostic to the underlying network. However, in error prone networks, integrating or aligning error protection algorithms in the application layer with FEC and channel coding in the link/physical layers is highly desirable and can facilitate efficiency in enhancing error performance of the overall system. Media-FLO™ is one example of a wireless video communication system where this type of integration or aligning is possible.

Therefore, certain embodiments of this disclosure can be implemented, for example, using MediaFLO™ video coding for delivering realtime video services in TM3 systems using the FLO Air Interface Specification, "Forward Link Only [FLO] Air Interface Specification for Terrestrial Mobile Multimedia Multicast", published as Technical Standard TIA-1099, August 2006, which is fully incorporated herein by reference for all purposes. The aspects, embodiments and/or examples described below relate to the algorithms and the inter-working between them to provide enhanced error performance in a FLO network. However, these aspects, embodiments and/or examples are intended to be generally applicable to all error prone networks.

Slices, as used herein, are chunks of independently decodable (e.g., using entropy decoding) coded video data. Slices in a FLO environment can be aligned to FLO frame boundaries. Access units (AU), as used herein, are coded video FLO frames. FLO frames are time division multiplexed (TDM) blocks of physical layer packets (e.g., called a TDM capsule) that offer a relatively high time diversity. A FLO superframe can correspond to one unit of time (e.g. 1 sec.) and thus contains a number of FLO frames (e.g., 4 FLO frames per 1 sec. FLO superframe). Each of these definitions can, and likely will, change for other error prone network types, and even within future FLO network configurations (e.g., a FLO superframe might incorporate a fixed number of FLO frames regardless of the time duration).

Within the current FLO environment, for example, aligning slice and AU boundaries to FLO frame boundaries in the time domain can result in the most efficient separation and localization of corrupted data. For example, during a deep fade, most of the contiguous fade data in a TDM capsule is usually affected by errors. But due to time diversity, the remaining TDM capsules have a high probability of being intact. Hence the uncorrupted data may be utilized to recover and conceal the lost data from the affected TDM capsule.

Similar logic applies to frequency domain multiplexing (FDM), where frequency diversity is attained through separation of the frequency sub-carriers that the data symbols modulate. Similar logic can also apply to spatial diversity (e.g., through separation in transmitter and receiver antennas), as well as other forms of diversity often applied in wireless networks (and other error prone networks).

Figure 10:
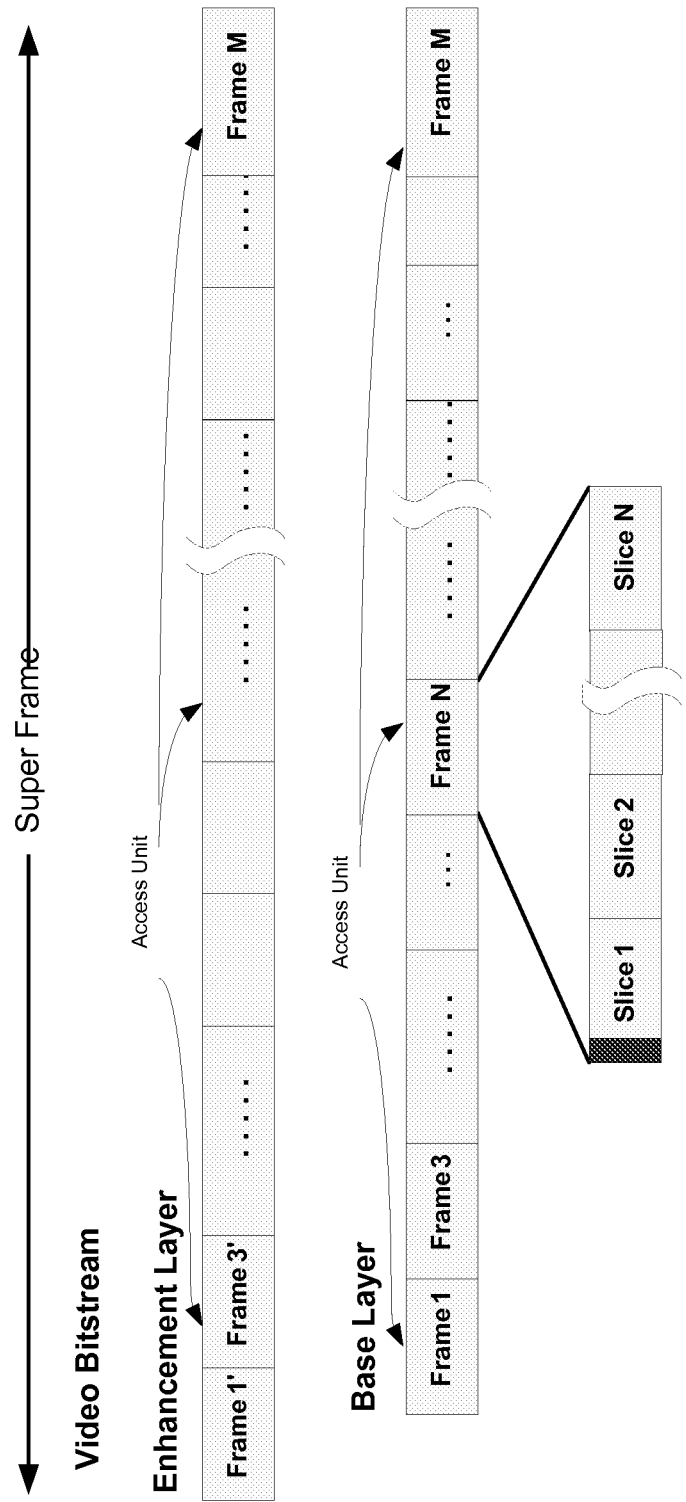
FIG. 10 shows an organization of the coded video data or video bitstream in slices and AUs.
Figure 11:
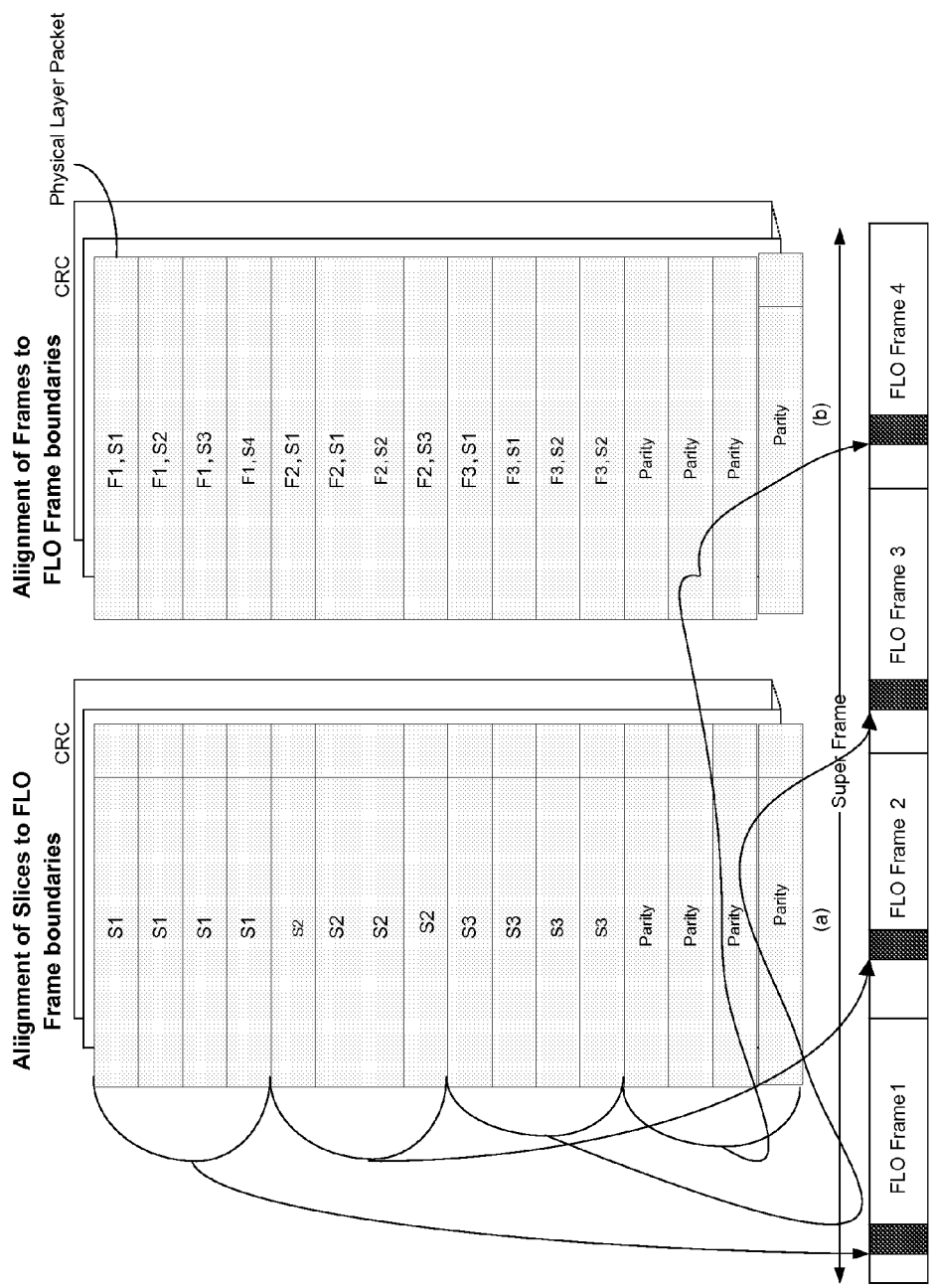
FIG. 11 shows the organization of video bitstream(s) in slices and AUs and their mapping to FLO frames.

In order to align slices and AU to FLO frames, the outer code (FEC) code block creation and MAC layer encapsulation should align as well. FIG. 10 shows an organization of the coded video data or video bitstream in slices and AUs. The coded video may be constituted in one or more bitstreams (e.g. base layer bitstream and/or enhancement layer bitstream), where layered video coding is applied in this example. FIG. 11 shows the organization of video bitstream(s) in slices and AUs and their mapping to FLO frames, where (a) shows alignment of slice boundaries to FLO frames, and (b) shows alignment of AU boundaries (F1, F2 . . . ) to FLO frames and slices (e.g., with the AUs are aligned to physical layer packets).

According to certain embodiments, the video bitstreams include AUs, and the AUs include slices of data. Each start of a slice is identified by a start code and provides for network adaptation. In general, I-frame or intra coded AUs are large, followed by P-frames, or forward predicted frames, followed by B-frames, or bi-directionally predicted frames. Coding an AU into multiple slices can incur an overhead cost in terms of the coded bitrate, since spatial prediction across slices is restricted to similarly-located slices of other frames, and multiple slice headers contribute to the overhead too. Since slice boundaries are usually resynchronization points, restricting contiguous physical layer packets (PLPs) to slices can help control errors, since, when a PLP is corrupted, error is confined to the slice in the PLP whereas if the PLP contained multiple slices or parts of multiple slices, the error would impact all slices or portions of slices in the PLP.

Since I-frames are usually larger than P- or B-frames, typically on the order of 10s of kilobits, the overhead due to multiple slices is not a large proportion of the total I-frame size or total bitrate. Also, having more slices in an I-AU enables better and more frequent resynchronization and more efficient spatial error concealment. Also, I-frames usually carry the most important information in the video bitstream since P and B frames are ultimately predicted off of I-frames. I-frames can also serve as random access points for channel acquisition.

Hence, in certain embodiments, careful alignment of the I-frames to the FLO frame boundaries, and the slices with an I-AU to FLO frame boundaries as well, can enable efficient error control, error protection (since if one slice that belonged to FLO Frame 1 is lost, slices that belong to FLO frame 2 are intact with a high probability since FLO frame 2 has a significant time separation from FLO frame 1) and error recovery, through, or example, resynchronization and error concealment.

In the case of P-frames, which are usually on the order of a few kilobits, aligning P-frame slices and an integer number of P-frames to FLO frame boundaries is desirable for similar reasons as those discussed above for I-frames. Here, temporal error concealment is typically employed. Alternatively, dispersing consecutive P-frames such that they arrive in different FLO frames can also provide time diversity among P-frames, since temporal concealment is based on motion vectors and data from previously reconstructed I- and/or P-frames.

In the case of B-frames, which can be extremely small (e.g., 100s or even 10s of bits) to moderately large (e.g. upwards of a few kilobits), aligning integer number of B-frames to FLO frame boundaries is desirable for similar reasons as those discussed above for P-frames.

In certain embodiments, error resilience in coded video bitstreams can incorporate prediction hierarchy and persistence properties. Consider the following prediction based hybrid compression system. Intra-frames are independently coded without any temporal prediction. However, spatial prediction is possible within a slice (i.e., spatial prediction is normally restricted across slice boundaries). Inter-frames are temporally prediction off of past and sometimes future (in case of B-frames).

In this system, the best predictor might be identified through a search process in the reference frame (or more than one reference frame) and a distortion measure such as SAD (i.e., sum of absolute differences between pixels of the block to be coded and those of the predictor block) can be used to identify the best match. Of course, other distortions measures can be used and are meant to be incorporated within the scope of this application.

The predictive coded region of the current frame may be a block of pixels of varying size and shape (e.g., 16×16, 32×32, 8×4, 2×2, etc) or a group of pixels identified as an object through, for example, segmentation. Temporal prediction typically extends over many frames (e.g., 10 to 100 frames) and is terminated when a frame is coded as I-frame. In this example, the I-frame frequency defines a group of pictures (GOP). For maximum coding efficiency, a GOP is a scene (i.e., GOP boundaries are aligned with scene boundaries and scene change frames are coded as I-frames).

In low motion sequences where the background is relatively static and motion is restricted to the foreground object (e.g., news programs, weather forecasts, etc., where more than approximately 30% of most viewed content is of this nature), most of the predicted regions (i.e., inter-coded) of predicted frames refer back to the I-frame through intermediate predicted frames (i.e., other P-frames). This prediction hierarchy 1200 shown in the FIG. 12.

Figure 12:
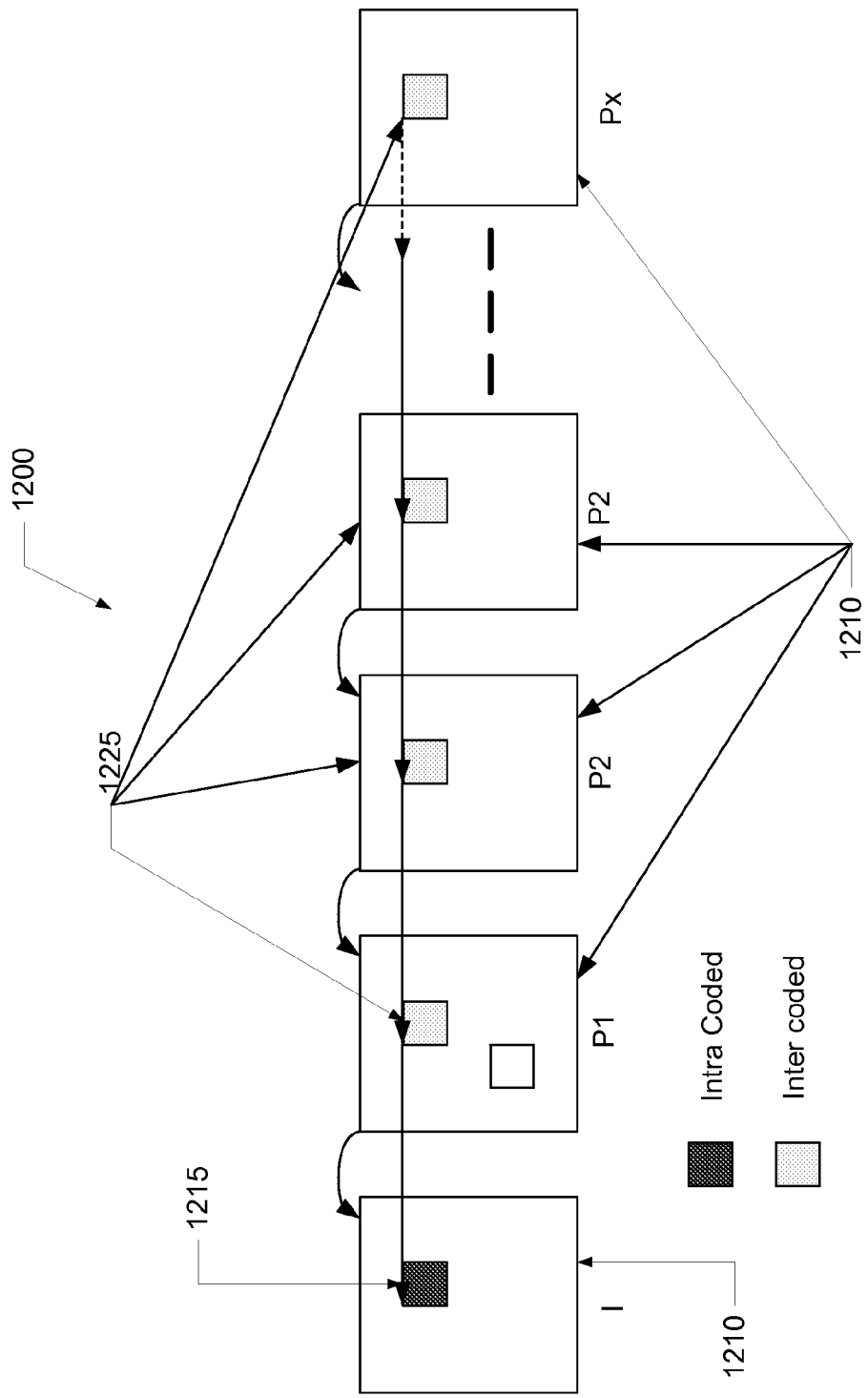
FIG. 12 shows a prediction hierarchy for predicted frame coding according to certain embodiments.

As shown in FIG. 12, an I-frame 1210 can include an intra-coded block 1215 upon which multiple inter-coded blocks 1225 of predicted frames 1220 can ultimately be based. Intra-coded block 1215 in I-frame 1210 is the predictor for the inter-coded blocks 1225 in predictive coded frames (or AU) P1-Px 1220. In this example, the region of these blocks is a stationary part of the background. Hence through consecutive temporal prediction, the sensitivity of intra-coded block 1215 to errors goes up since it is a GOOD predictor which also implies that its "importance" is higher. Additionally, intra-coded block 1215, by virtue of this chain of temporal predictions called its prediction chain, persists longer in the display (i.e., potentially for the duration of an entire scene).

In certain embodiments, the prediction hierarchy is defined as the tree of blocks created based on this "importance" level or measure of persistence with the parent at the top (e.g., block 1215 in FIG. 12) and the children at the bottom. Note that the inter-coded block in frame P1 is on the 2nd level of the hierarchy and so on. Leaves of the tree are those blocks that terminate a prediction chain (e.g., frame Px in FIG. 12).

In certain embodiments, prediction hierarchy may be created for video sequences irrespective of content type (e.g., such as music and sports as well, and not just news) and can be applicable to prediction based video (and audio, and data, etc.) compression in general (i.e., this can apply to all the aspects described in this application).

Once the prediction hierarchy is established, error resilience algorithms such as adaptive intra refresh (AIR), for example, may be applied more effectively.

According to an aspect, algorithms can estimate the importance measure based on the number of times a block is used as a predictor, which can be referred to as the persistence metric. This persistence metric is also used to improve coding efficiency by arresting prediction error propagation. The metric can also increases bit allocation for the blocks with higher importance.

Usually, the goal of a video codec is to achieve a quality as high as possible at a given bandwidth. Quality is often evaluated with peak signal-to-noise ratio (PSNR). Since the encoding mode (e.g., all possible intra and inter schemes) and the quantization parameter (QP) of every macroblock of every frame affect quality as well as bandwidth, a global optimization scheme involves the joint decision of the mode and QP of all these macroblocks. However, given current, practical processing capabilities, it is mathematically intractable to do this global optimization. Instead, a practical coding scheme attempts to achieve a good rate-distortion (R-D) decision for the current frame based on the reconstructed previously encoded frames. Therefore, the joint optimization problem is reduced to a causal optimization problem according to certain embodiments.

In a reference frame, some macroblocks are more important than other macroblocks in the prediction chain. For example, a foreground object might duplicate itself in some future frames (i.e., still within the range of multiple reference frames). If this object is accurately represented, all its clones may be simply coded as a motion vector, thus saving bits. In contrast, a disappearing object or a covered background will not be referenced by future frames any more, thus its quality will not affect future frames.

Figure 13:
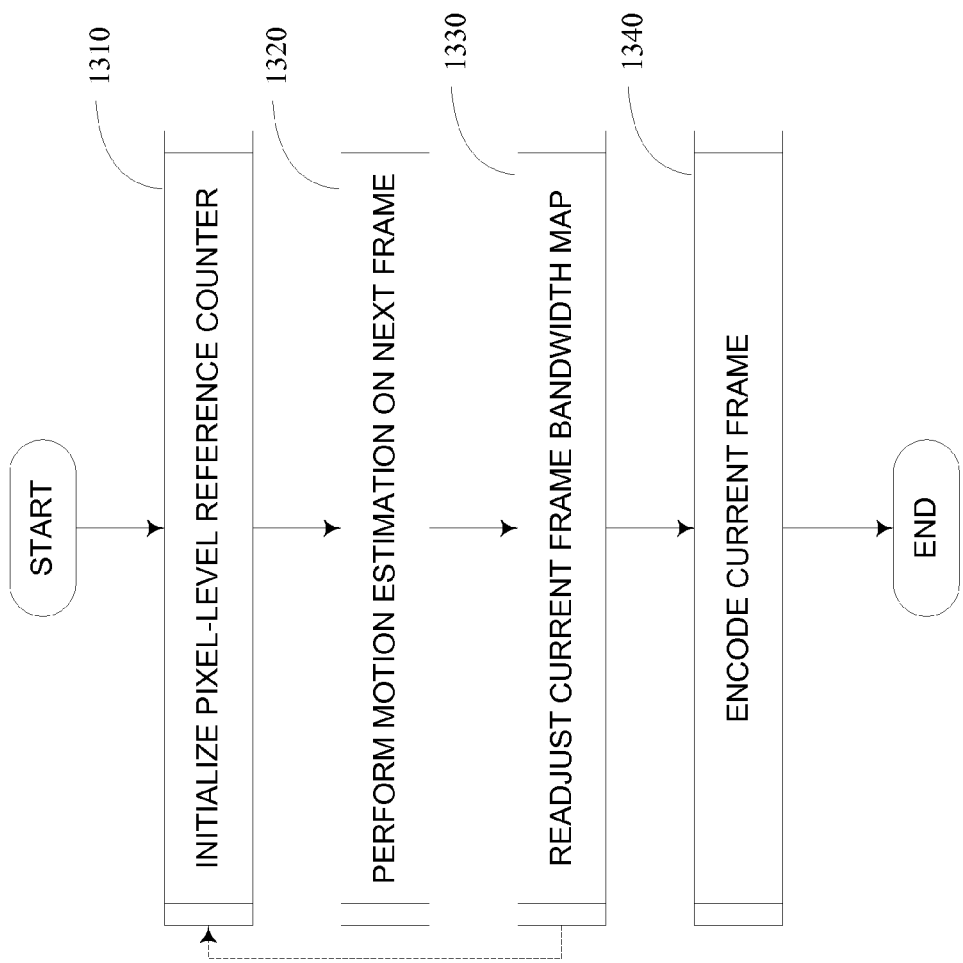
FIG. 13 shows a two-pass algorithm to determine the prediction chain and put more significance to the frequently reference macroblocks according to certain embodiments.

In certain embodiments, a two-pass algorithm to determine the prediction chain and put more significance to the frequently reference macroblocks is described herein. A bandwidth map value for a MB may be defined as the estimated complexity for the map which is then used to determine the number or proportion of bits to allocate during rate control for optimal quality in R-D terms. This process might be illustrated as (see FIG. 13):

1. Pass one. Initialize a pixel-level reference counter 1310 $R(i, j)=0$, where $0 \leq i < W$, $0 \leq j < H$, W is the width of a frame, and H is the height of a frame.
2. Perform 16×16 motion estimation of the next frame 1320 referring to the current frame. Whenever a pixel at location (i, j) in the current frame is referenced, increment $R(i, j)$ by one.
3. Pass two. Readjust the macroblock bandwidth map of the current frame 1330.

For a macroblock located at (x, y), we scale up its bandwidth map value by $$C + \sum_{i=x}^{x+15} \sum_{j=y}^{y+15} R(i, j),$$

where C is a constant to be determined by experiment. Incrementing the bandwidth map value causes more bits to be allocated to macroblocks that are good predictors (i.e. many more future MBs in future frames are predicted off of these macroblocks).

4. Encode the current frame 1340 with the updated macroblock bandwidth map.

It should be noted that the algorithm makes the bitstream more robust to channel errors by emphasizing macroblocks that are referenced to often. Any gain in PSNR is due to the fact that early termination of a predictive chain arrests propagation of prediction error (due to residual coding). Additionally, good predictors are refreshed by intra coding earlier than later thus preventing error propagation if a good predictor is impacted by error.

According to certain embodiments, a channel switch frame (CSF) is defined as a random access frame inserted at various (e.g., appropriate) locations in a broadcast stream for the purpose of facilitating faster channel acquisition and thus fast channel change between streams in a broadcast multiplex. Exemplary specifics regarding one CSF can be found in the commonly-assigned U.S. patent application Ser. No. 11/527,306, filed on Sep. 25, 2006, and Ser. No. 11/528,303, filed on Sep. 26, 2006, both of which are fully incorporated herein by reference for all purposes. An I-frame or a progressive I-frame, such as the progressive decoder refresh frame in H.264, typically serves as a random access point for channel switching. However, frequent I-frames (e.g., short GOPs, at least, shorter than scene durations) can result in a significant reduction in compression efficiency.

Since intra coding blocks may be required for error resilience, random access and error resilience may be effectively combined through prediction hierarchy to improve coding efficiency while increasing robustness to errors. This combination can be achieved based at least in part on the following observations:

A. For low motion sequences, prediction chains are long and a significant portion of the information required to reconstruct a superframe or scene is contained in the I-frame that occurred at the start of the scene.
B. Channel errors tend to be bursty and when a fade strikes and FEC and channel coding fail, there is heavy residual error that concealment fails.
C. This is particularly severe for low motion (and hence low bit rate) sequences since the amount of coded data is not significant enough to provide good time diversity within the video bitstream and because these are highly compressible sequences that renders every bit all the more important for reconstruction.
D. High motion sequences are more robust to errors due to the nature of content—more new information in every frame increases the number of coded intra blocks which are independently decodable and more resilient to error inherently.
E. Adaptive intra-refresh (AIR), based on prediction hierarchy achieves high performance for high motion sequences and performance improvement is not significant for low motion sequences.
F. Hence a channel switch frame containing most of the I-frame is a good source of diversity for low motion sequences. When an error strikes a superframe, decoding in the consecutive frame starts from the CSF which recovers the lost information due to prediction. Thus error resilience is achieved.
G. In the case of high motion sequences, the CSF consists of blocks that persist in the superframe, i.e., those that are good predictors. All other regions of the CSF do not have to be coded since these are blocks that have short prediction chains, which imply that they are terminated with intra blocks. Hence CSF still serves to recover from lost information due to prediction when an error strikes.
H. Based on (f) and (g) above:
  H.1. CSFs for low motion sequences are on par with the size of I-frames—they may be coded at a lower bit rate through heavier quantization, and
  H.2. CSFs for high motion sequences are much smaller than the corresponding I-frames.
I. Scalability to support hierarchical modulation in physical layer technologies requires data partitioning of the video bitstream with specific bandwidth ratios. These are not always the ideal ratios for optimal scalability (least overhead).
J. FLO, for example only, requires 2-layer scalability with 1:1 bandwidth ratio. Hence partitioning video bitstream to 2-layers of equal size is not efficient for low motion (bitrate) sequences. The base layer containing all header and metadata information is larger than the enhancement layer. However, since CSFs for low motion sequences are larger, they fit nicely in the remaining bandwidth in the enhancement layer. Hence error resilience based on prediction hierarchy works well with scalability and a highly efficient layered coding is achieved.
K. For high motion sequences, there is sufficient residual information that data partitioning to 1:1 may be achieved with the least overhead. Moreover, CSFs for such sequences can be much smaller. Thus, error resilience based on prediction hierarchy can work well with scalability for this case as well.
L. Extending the concepts discussed in (a) through (k) for moderate motion clips is possible based on the descriptions of these algorithms, which makes it easy to see that the proposed concepts apply for video coding in general.

The above system is merely illustrative of an example of a multimedia streaming system where input to the system is a continuous (still discrete time events, but never ending) stream of data and output to the system is a continuous stream of data.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core or ASIC core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, an optical storage medium, or any other form of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

Thus, methods and apparatus to perform highly efficient encoding of multimedia data providing for efficient decoding quality and error concealment have been described.

What is claimed is:

1. A method of processing multimedia data, including a plurality of video frames, the method comprising:
   initializing a pixel-level reference counter for a current frame;
   performing a prediction of a next frame referring to the current frame;
   incrementing the pixel-level reference counter for each pixel of the current frame that is referenced during the prediction of the next frame; and
   readjusting a macroblock bandwidth map of the current frame based at least in part on the incremented pixel-level reference counter, wherein, for a N×M macroblock (x, y), readjusting the macroblock bandwidth map of the current frame includes scaling bandwidth map values of the macroblock bandwidth map in accordance with the following equation:

$$C + \sum_{i=x}^{x+(N-1)} \sum_{j=y}^{y+(M-1)} R(i, j),$$

wherein C is a constant determined by experiment, and R(i, j) is the pixel-level reference counter for the N×M macroblock (x, y), and
   wherein the macroblock bandwidth map indicates a bit allocation used to code one or more blocks of the current frame.

2. The method of claim 1, wherein the pixel-level reference counter is indexed to a width and a height of the current frame.

3. The method of claim 2, wherein the pixel-level reference counter is provided by a first equation, $R(i, j)=0$, where $0 \leq i < W$, $0 \leq j < H$, W is the width of the current frame, and H is the height of the current frame.

4. The method of claim 3, wherein the prediction of the next frame includes performing motion estimation for blocks of the next frame.

5. The method of claim 1, further including repeating the steps of initializing, performing and readjusting for each next frame in a plurality of next frames referring to the current frame.

6. The method of claim 5, further including encoding the current frame based at least in part on the readjusted macroblock bandwidth map of the current frame.

7. The method of claim 1, wherein the bit allocation used to code the one or more blocks is based on one or more of the following:
   a number of bits to be allocated to the one or more blocks to code the one or more blocks; and
   a proportion of bits to be allocated to the one or more blocks to code the one or more blocks.

8. The method of claim 7, wherein readjusting the macroblock bandwidth map of the current frame based at least in part on the incremented pixel-level reference counter comprises:
   allocating relatively more bits to blocks of the current frame that include pixels that correspond to relatively higher count values in the pixel-level reference counter than to blocks of the current frame that include pixels that correspond to relatively lower count values in the pixel-level reference counter; and
   allocating relatively fewer bits to the blocks of the current frame that include pixels that correspond to relatively lower count values in the pixel-level reference counter than to the blocks of the current frame that include pixels that correspond to relatively higher count values in the pixel-level reference counter.

9. The method of claim 1, wherein N is equal to 16 and M is equal to 16.

10. A device comprising:
a memory; and
a processor for processing multimedia data including a plurality of video frames, the processor being configured to:
initialize a pixel-level reference counter for a current frame;
perform a prediction of a next frame referring to the current frame;
increment the pixel-level reference counter for each pixel of the current frame that is referenced during the prediction of the next frame; and
readjust a macroblock bandwidth map of the current frame based at least in part on the incremented pixel-level reference counter, wherein, for a N×M macroblock (x, y), readjusting the macroblock bandwidth map of the current frame includes scaling bandwidth map values of the macroblock bandwidth map in accordance with the following equation:

$$C + \sum_{i=x}^{x+(N-1)} \sum_{j=y}^{y+(M-1)} R(i, j),$$

wherein C is a constant determined by experiment, and R(i, j) is the pixel-level reference counter for the N×M macroblock (x, y), and
wherein the macroblock bandwidth map indicates a bit allocation used to code one or more blocks of the current frame.

11. The device of claim 10, wherein the pixel-level reference counter is indexed to a width and a height of the current frame.

12. The device of claim 11, wherein the pixel-level reference counter is provided by a first equation, R(i, j)=0, where 0≤i<W, 0≤j<H, W is the width of the current frame, and H is the height of the current frame.

13. The device of claim 12, wherein the prediction of the next frame includes a motion estimation prediction for blocks of the next frame.

14. The device of claim 10, wherein the processor is further configured to repeat the functions of initialize, perform and readjust for each next frame in a plurality of next frames referring to the current frame.

15. The device of claim 14, wherein the processor is further configured to encode the current frame based at least in part on the readjusted macroblock bandwidth map of the current frame.

16. The device of claim 10, wherein the bit allocation used to code the one or more blocks is based on one or more of the following:
a number of bits to be allocated to the one or more blocks to code the one or more blocks; and
a proportion of bits to be allocated to the one or more blocks to code the one or more blocks.

17. The device of claim 16, wherein to readjust the macroblock bandwidth map of the current frame based at least in part on the incremented pixel-level reference counter, the processor is configured to:
allocate relatively more bits to blocks of the current frame that include pixels that correspond to relatively higher count values in the pixel-level reference counter than to blocks of the current frame that include pixels that correspond to relatively lower count values in the pixel-level reference counter; and
allocate relatively fewer bits to the blocks of the current frame that include pixels that correspond to relatively lower count values in the pixel-level reference counter than to the blocks of the current frame that include pixels that correspond to relatively higher count values in the pixel-level reference counter.

18. The device of claim 10, wherein N is equal to 16 and M is equal to 16.

19. An apparatus for processing multimedia data, including a plurality of video frames, the apparatus comprising:
an initializer for initializing a pixel-level reference counter for a current frame;
a performer for performing a prediction of a next frame referring to the current frame;
an incrementer for incrementing the pixel-level reference counter for each pixel of the current frame that is referenced during the prediction of the next frame; and
a readjuster for readjusting a macroblock bandwidth map of the current frame based at least in part on the incremented pixel-level reference counter, wherein, for a N×M macroblock (x, y), the readjuster is configured to readjust the macroblock bandwidth map of the current frame by at least scaling bandwidth map values of the macroblock bandwidth map in accordance with the following equation:

$$C + \sum_{i=x}^{x+(N-1)} \sum_{j=y}^{y+(M-1)} R(i, j),$$

wherein C is a constant determined by experiment, and R(i, j) is the pixel-level reference counter for the N×M macroblock (x, y),
wherein the macroblock bandwidth map indicates a bit allocation used to code one or more blocks of the current frame, and
wherein one or more of:
the initializer comprises a hardware initializer,
the performer comprises a hardware performer,
the incrementer comprises a hardware incrementer, and
the readjuster comprises a hardware readjuster.

20. The apparatus of claim 19, wherein the pixel-level reference counter is indexed to a width and a height of the current frame.

21. The apparatus of claim 20, wherein the pixel-level reference counter is provided by a first equation, R(i, j)=0, where 0≤i<W, 0≤j<H, W is the width of the current frame, and H is the height of the current frame.

22. The apparatus of claim 21, wherein the performer prediction of the next frame includes a motion estimation prediction for blocks of the next frame.

23. The apparatus of claim 19, further including a repeater to coordinate repeating the functions of the initializer, performer and readjuster for each next frame in a plurality of next frames referring to the current frame.

24. The apparatus of claim 23, further including an encoder to encode the current frame based at least in part on the readjusted macroblock bandwidth map of the current frame.

25. The apparatus of claim 19, wherein the bit allocation used to code the one or more blocks is based on one or more of the following:
- a number of bits to be allocated to the one or more blocks to code the one or more blocks; and
- a proportion of bits to be allocated to the one or more blocks to code the one or more blocks.

26. The apparatus of claim 25, wherein to readjust the macroblock bandwidth map of the current frame based at least in part on the incremented pixel-level reference counter, the readjuster is configured to:
- allocate relatively more bits to blocks of the current frame that include pixels that correspond to relatively higher count values in the pixel-level reference counter than to blocks of the current frame that include pixels that correspond to relatively lower count values in the pixel-level reference counter; and
- allocate relatively fewer bits to the blocks of the current frame that include pixels that correspond to relatively lower count values in the pixel-level reference counter than to the blocks of the current frame that include pixels that correspond to relatively higher count values in the pixel-level reference counter.

27. The apparatus of claim 19, wherein N is equal to 16 and M is equal to 16.

28. An apparatus for processing multimedia data, including a plurality of video frames, the apparatus comprising:
- means for initializing a pixel-level reference counter for a current frame;
- means for performing a prediction of a next frame referring to the current frame;
- means for incrementing the pixel-level reference counter for each pixel of the current frame that is referenced during the prediction of the next frame; and
- means for readjusting a macroblock bandwidth map of the current frame based at least in part on the incremented pixel-level reference counter, wherein, for a N×M macroblock (x, y), the means for readjusting the macroblock bandwidth map of the current frame comprise means for scaling bandwidth map values of the macroblock bandwidth map in accordance with the following equation:

$$C + \sum_{i=x}^{x+(N-1)} \sum_{j=y}^{y+(M-1)} R(i, j),$$

- wherein C is a constant determined by experiment, and R(i, j) is the pixel-level reference counter for the N×M macroblock (x, y), and
- wherein the macroblock bandwidth map indicates a bit allocation used to code one or more blocks of the current frame.

29. The apparatus of claim 28, wherein the pixel-level reference counter is indexed to a width and a height of the current frame.

30. The apparatus of claim 29, wherein the pixel-level reference counter is provided by a first equation, R(i, j)=0, where 0≤i<W, 0≤j<H, W is the width of the current frame, and H is the height of the current frame.

31. The apparatus of claim 30, wherein the means for prediction of the next frame includes means for performing motion estimation for blocks of the next frame.

32. The apparatus of claim 28, further including means for repeating the means for initializing, performing and readjusting for each next frame in a plurality of next frames referring to the current frame.

33. The apparatus of claim 32, further including means for encoding the current frame based at least in part on the readjusted macroblock bandwidth map of the current frame.

34. The apparatus of claim 28, wherein the bit allocation used to code the one or more blocks is based on one or more of the following:
- a number of bits to be allocated to the one or more blocks to code the one or more blocks; and
- a proportion of bits to be allocated to the one or more blocks to code the one or more blocks.

35. The apparatus of claim 34, wherein the means for readjusting the macroblock bandwidth map of the current frame based at least in part on the incremented pixel-level reference counter comprises:
- means for allocating relatively more bits to blocks of the current frame that include pixels that correspond to relatively higher count values in the pixel-level reference counter than to blocks of the current frame that include pixels that correspond to relatively lower count values in the pixel-level reference counter; and
- means for allocating relatively fewer bits to the blocks of the current frame that include pixels that correspond to relatively lower count values in the pixel-level reference counter than to the blocks of the current frame that include pixels that correspond to relatively higher count values in the pixel-level reference counter.

36. The apparatus of claim 28, wherein N is equal to 16 and M is equal to 16.

37. A non-transitory machine readable storage medium comprising instructions, for processing multimedia data including a plurality of video frames, that upon execution cause a machine to:
- initialize a pixel-level reference counter for a current frame;
- perform a prediction of a next frame referring to the current frame;
- increment the pixel-level reference counter for each pixel of the current frame that is referenced during the prediction of the next frame; and
- readjust a macroblock bandwidth map of the current frame based at least in part on the incremented pixel-level reference counter, wherein, for a N×M macroblock (x, y), the instructions cause the machine to readjust the macroblock bandwidth map of the current frame by at least scaling bandwidth map values of the macroblock bandwidth map in accordance with the following equation:

$$C + \sum_{i=x}^{x+(N-1)} \sum_{j=y}^{y+(M-1)} R(i, j),$$

- wherein C is a constant determined by experiment, and R(i, j) is the pixel-level reference counter for the N×M macroblock (x, y), and
- wherein the macroblock bandwidth map indicates a bit allocation used to code one or more blocks of the current frame.

38. The non-transitory machine readable storage medium of claim 37, wherein the pixel-level reference counter is indexed to a width and a height of the current frame.

39. The non-transitory machine readable storage medium of claim 38, wherein the pixel-level reference counter is provided by a first equation, $R(i, j)=0$, where $0 \le i < W$, $0 \le j < H$, W is the width of the current frame, and H is the height of the current frame.

40. The non-transitory machine readable storage medium of claim 39, further comprising instructions that upon executing cause the machine to perform a motion estimation prediction for blocks of the next frame.

41. The non-transitory machine readable storage medium of claim 37, further comprising instructions that upon executing cause the machine to repeat the functions of initialize, perform and readjust for each next frame in a plurality of next frames referring to the current frame.

42. The non-transitory machine readable storage medium of claim 41, further comprising instructions that upon executing cause the machine to encode the current frame based at least in part on the readjusted macroblock bandwidth map of the current frame.

43. The non-transitory machine readable storage medium of claim 37, wherein the bit allocation used to code the one or more blocks is based on one or more of the following:
   a number of bits to be allocated to the one or more blocks to code the one or more blocks; and
   a proportion of bits to be allocated to the one or more blocks to code the one or more blocks.

44. The non-transitory machine readable storage medium of claim 43, wherein the instructions that cause the machine to readjust the macroblock bandwidth map of the current frame based at least in part on the incremented pixel-level reference counter comprise instructions that cause the machine to:
   allocate relatively more bits to blocks of the current frame that include pixels that correspond to relatively higher count values in the pixel-level reference counter than to blocks of the current frame that include pixels that correspond to relatively lower count values in the pixel-level reference counter; and
   allocate relatively fewer bits to the blocks of the current frame that include pixels that correspond to relatively lower count values in the pixel-level reference counter than to the blocks of the current frame that include pixels that correspond to relatively higher count values in the pixel-level reference counter.

45. The non-transitory machine readable storage medium of claim 37, wherein N is equal to 16 and M is equal to 16.

* * * * *